US012579214B2

(12) United States Patent
Wasserkrug et al.

(10) Patent No.: US 12,579,214 B2
(45) Date of Patent: Mar. 17, 2026

(54) AUGMENTING MATHEMATICAL OPTIMIZATION MODELS GENERATED FROM HISTORICAL DATA

(71) Applicant: International Business Machines Corporation, Armonk, NY (US)

(72) Inventors: Eliezer Segev Wasserkrug, Haifa (IL); Orit Davidovich, Haifa (IL); Evgeny Shindin, Nesher (IL); Dharmashankar Subramanian, White Plains, NY (US); Parikshit Ram, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 17/589,092

(22) Filed: Jan. 31, 2022

(65) Prior Publication Data

US 2023/0244752 A1 Aug. 3, 2023

(51) Int. Cl.
*G06F 17/17* (2006.01)

(52) U.S. Cl.
CPC .................................... *G06F 17/17* (2013.01)

(58) Field of Classification Search
CPC .......... G06F 17/11; G06F 17/12; G06F 17/17; G06F 17/18; G05B 13/041; G05B 13/042
See application file for complete search history.

(56) References Cited

U.S. PATENT DOCUMENTS

| | | | |
|---|---|---|---|
| 2015/0294048 A1* | 10/2015 | Jones ................. | G06Q 10/0635 |
| | | | 703/2 |
| 2017/0083822 A1 | 3/2017 | Adendorff et al. | |
| 2019/0018823 A1 | 1/2019 | Yabe et al. | |
| 2019/0122073 A1 | 4/2019 | Ozdemir et al. | |
| 2020/0012984 A1 | 1/2020 | Mantryvong et al. | |
| 2020/0104736 A1* | 4/2020 | Sharma .............. | G06Q 10/0631 |
| 2021/0178600 A1 | 6/2021 | Jha et al. | |

OTHER PUBLICATIONS

H. Wang et al., Offline Data-Driven Evolutionary Optimization Using Selective Surrogate Ensembles, IEEE Transactions on Evolutionary Computation, vol. 23, No. 2, 2019 (Year: 2019).*
A. Gupta et al., Evolutionary multitasking in bi-level optimization, Complex Intell. Syst., DOI 10.1007/s40747-016-0011-y, 1:83-95, 2015 (Year: 2015).*
H. Wang et al., Committee-Based Active Learning for Surrogate-Assisted Particle Swarm Optimization of Expensive Problems, IEEE Transactions on Cybernetics, Vo. 47, No. 9, 2017 (Year: 2017).*

(Continued)

*Primary Examiner* — Emily E Larocque
(74) *Attorney, Agent, or Firm* — Kelsey M. Skodje

(57) ABSTRACT

An example system includes a processor to receive historical data, a formal quality measure, a quality threshold, and a mathematical optimization model. At least part of the mathematical optimization model is generated from the historical data. The processor can measure a quality of the mathematical optimization model using the formal quality measure. The processor can then augment the mathematical optimization model such that the measured quality of the augmented mathematical optimization model exceeds the target quality threshold.

20 Claims, 14 Drawing Sheets

RECEIVE HISTORICAL DATA, FORMAL QUALITY MEASURE, TARGET QUALITY THRESHOLD, AND MATHEMATICAL OPTIMIZATION MODEL, WHERE AT LEAST PART OF MATHEMATICAL OPTIMIZATION MODEL IS GENERATED FROM HISTORICAL DATA — 302

MEASURE QUALITY OF MATHEMATICAL OPTIMIZATION MODEL USING FORMAL QUALITY MEASURE — 304

AUGMENT MATHEMATICAL OPTIMIZATION MODEL SUCH THAT MEASURED QUALITY OF AUGMENTED MATHEMATICAL OPTIMIZATION MODEL EXCEEDS TARGET QUALITY THRESHOLD — 306

GENERATE IMPROVED SOLUTIONS USING AUGMENTED OPTIMIZATION MODEL — 308

COLLECT ADDITIONAL DATA FROM IMPROVED SOLUTIONS AND ADD TO HISTORICAL DATA — 310

300

(56) References Cited

OTHER PUBLICATIONS

M.T.M. Emmerich, et al., Single- and Multiobjective Evolutionary Optimization Assisted by Gaussian Random Field Metamodels, IEEE Transactions on Evolutionary Computation, vol. 10, No. 4, 2006 (Year: 2006).*

G Sharma et al., Automatic Generation Control (AGC) of Wind Power System; an Least Squares-Support Vector Machine (LS-SVM) Radial Basis Function (RBF) Kernel Approach, Electric Power Components and Systems, Taylor & Francis, 0(0): 1-12, 2018 (Year: 2018).*

V. Shymkovych et al., Hardware implementation of radial-basis neural networks with Gaussian activation functions on FPGA, 33: 9467-9479, Neural Computing and Applications (2021) (Year: 2021).*

Arcangioli et al. "Multiple Constraint Acquisition", IJCAI'16: Proceedings of the Twenty-Fifth International Joint Conference on Artificial Intelligence, Jul. 9, 2016, pp. 698-704.

Baumann et al., "Reliable estimation of prediction errors for QSAR models under model uncertainty using double cross-validation", Journal of Cheminformatics vol. 6, No. 47, 2014, 19 pages.

Ben-Tal et al. "Robust Optimization", Princeton University, May 8, 2009, 570 pages.

Bertsimas et al. "Theory and Applications of Robust Optimization", arXiv: 1010.5445 [math.OC], Oct. 26, 2010, 464-501, vol. 53, No. 3.

Bertsimas et al., "Data-driven robust optimization", Math. Program., Ser. A, Feb. 2017, 58 pages, http://www.mit.edu/~dbertsim/papers/Robust%20Optimization/Data-driven%20robust%20optimization.pdf.

Elmachtoub et al. Smart "Predict, then Optimize", arXiv: 1710. 08005 [math. OC], Oct. 22, 2017, 46 pages.

Frau et al., "Uncertainty Estimation for Machine Learning Models in Multiphase Flow Applications", Informatics, vol. 8, Sep. 2021, 21 pages.

Lombardi et al. "Empirical Decision Model Learning", Artificial Intelligence, Jan. 2016, 25 pages, vol. 244, No. 2.

Ning et a;., "Data-Driven Decision Making under Uncertainty Integrating Robust Optimization with Principal Component Analysis and Kernel Smoothing Methods", Computers & Chemical Engineering, Feb. 2018, 58 pages.

Unknown, Optaplanner Heuristic Engine, optaplanner, 6 pages, retrieved on Sep. 9, 2024, https://www.optaplanner.org.

Osman et al., "Machine Learning in Measurement Part 2: Uncertainty Quantification", IEEE Instrumentation and Measurement Magazine, May 2021, 9 pages.

Raedt Luc De. "Learning Constraints From Examples", Proceedings of the AAAI Conference on Artificial Intelligence, Feb. 8, 2012, 7965-7970.

Singla et al., "A survey of robust optimization based machine learning with special reference to support vector machines", International Journal of Machine Learning and Cybernetic, vol. 11, Dec. 2019, 27 pages.

Subramanian et al. A Prediction-Optimization Framework for Site-Wide Process Optimization, IEEE International Congress on Internet of Things (ICIOT), Jul. 8-13, 2019, 8 pages.

Sutton et al. "Reinforcement Learning: An Introduction", The MIT Press Cambridge, Massachusetts London, England, 2018, 352 pages.

Tulabandhula et al., "Robust Optimization using Machine Learning for Uncertainty Sets", arXiv, Jul. 4, 2014, 28 pages, https://arxiv.org/abs/1407.1097.

Unknown, "Optquest simulation engine", OptTek, retrieved on Sep. 9, 2024, 11 pages, https://www.opttek.com/products/optquest/.

Yang et al. "Metaheuristic Optimization", Scholarpedia, Jan. 2011, :11472:15 pages, vol. 6, No. 8.

Yu et al. "MOPO: Model-based Offline Policy Optimization", arXiv:2005.13239 [cs.LG], May 27, 2020, 14 pages.

Zhang et al., "Robust Optimization With Parameter and Model Uncertainties Using Gaussian Processes", Journal of Mechanical Design, vol. 138, Nov. 2016, 11 pages.

Mell et al., "The NIST Definition of Cloud Computing", National Institute of Standards and Technology, U.S. Department of Commerce, Special Publication 800-145, Sep. 2011, 7 pages.

No Author. "OptQuest—The World's Leading Simulation Optimization Engine", OptTek Systems, Jun. 30, 2025, 9 Pages.

No Author. "Solve planning and scheduling problems with OptaPlanner", OptaPlanner, Redhat, Jun. 30, 2025, 6 Pages.

Biggs et al., "Optimizing Objective Functions Determined From Random Forests", Jun. 16, 2017, 46 pages, https://papers.ssrn.com/sol3/papers.cfm?abstract_id=2986630.

Fajemisin et al., "Highlights: Optimization with Constraint Learning: A Framework and Survey," , Oct. 5, 2021, 52 pgs, https://arxiv.org/abs/2110.02121v1.

Maragno et al., "Mixed-Integer Optimization with Constraint Learning", Nov. 4, 2021, 48 pages, arXiv:2111.04469v1 [math.OC].

* cited by examiner $\underline{200}$

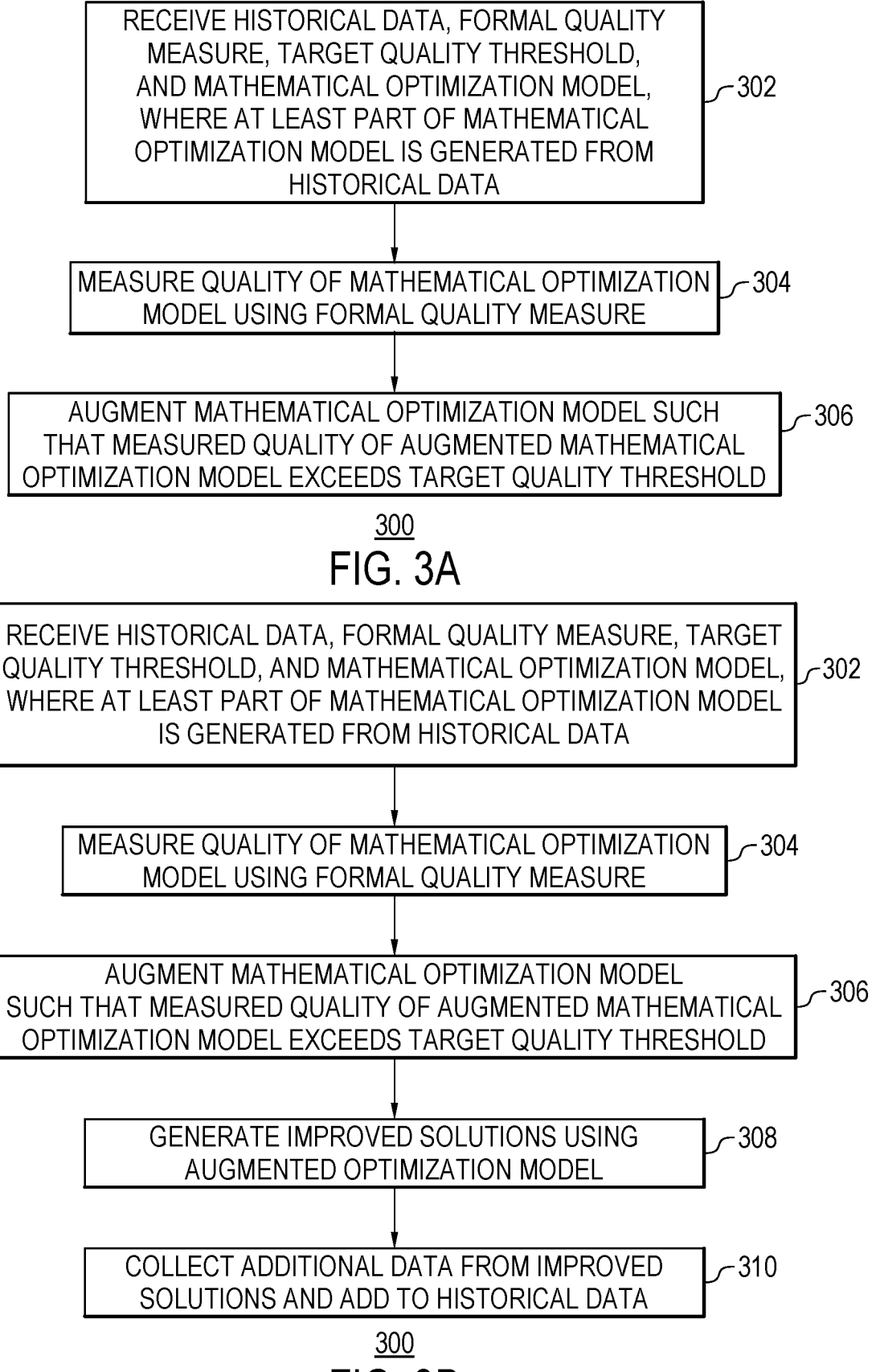

RECEIVE HISTORICAL DATA, FORMAL QUALITY MEASURE, TARGET QUALITY THRESHOLD, AND MATHEMATICAL OPTIMIZATION MODEL, WHERE AT LEAST PART OF MATHEMATICAL OPTIMIZATION MODEL IS GENERATED FROM HISTORICAL DATA ⌐302

MEASURE QUALITY OF MATHEMATICAL OPTIMIZATION MODEL USING FORMAL QUALITY MEASURE ⌐304

AUGMENT MATHEMATICAL OPTIMIZATION MODEL SUCH THAT MEASURED QUALITY OF AUGMENTED MATHEMATICAL OPTIMIZATION MODEL EXCEEDS TARGET QUALITY THRESHOLD ⌐306

RECEIVE HISTORICAL DATA, FORMAL QUALITY MEASURE, TARGET QUALITY THRESHOLD, AND MATHEMATICAL OPTIMIZATION MODEL, WHERE AT LEAST PART OF MATHEMATICAL OPTIMIZATION MODEL IS GENERATED FROM HISTORICAL DATA ⌐302

MEASURE QUALITY OF MATHEMATICAL OPTIMIZATION MODEL USING FORMAL QUALITY MEASURE ⌐304

AUGMENT MATHEMATICAL OPTIMIZATION MODEL SUCH THAT MEASURED QUALITY OF AUGMENTED MATHEMATICAL OPTIMIZATION MODEL EXCEEDS TARGET QUALITY THRESHOLD ⌐306

GENERATE IMPROVED SOLUTIONS USING AUGMENTED OPTIMIZATION MODEL ⌐308

COLLECT ADDITIONAL DATA FROM IMPROVED SOLUTIONS AND ADD TO HISTORICAL DATA ⌐310

RECEIVE HISTORICAL DATA USED TO
GENERATE OPTIMIZATION MODEL ⌐402

DEFINE FORMAL QUALITY MEASURE OF QUALITY
IMPROVEMENT AND CONSTRAINT SATISFACTION ⌐404

GENERATE AUGMENTED OPTIMIZATION MODEL THAT
MEETS FORMAL QUALITY MEASURE
AND IS BASED ON HISTORICAL DATA ⌐406

400

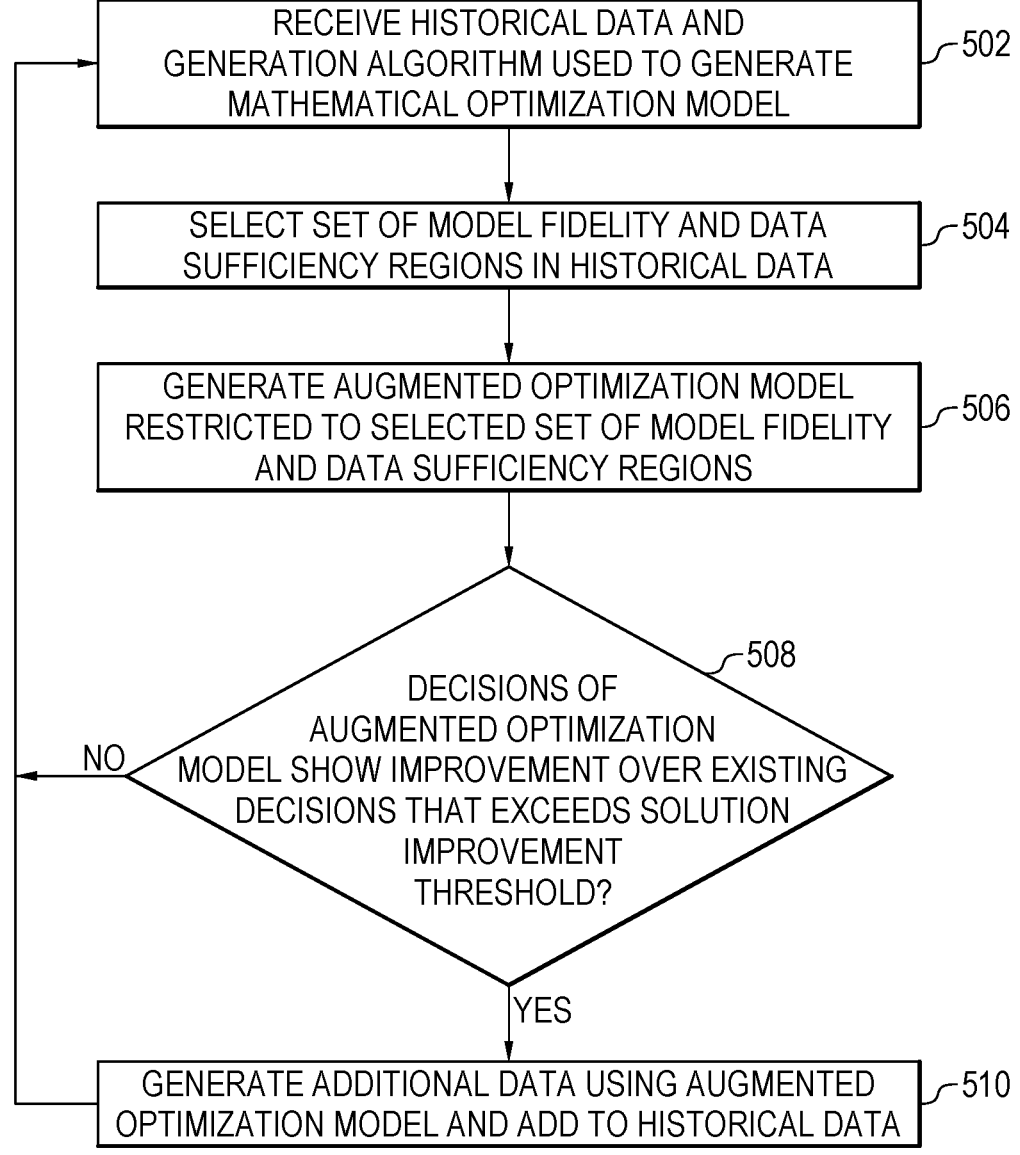

RECEIVE HISTORICAL DATA AND GENERATION ALGORITHM USED TO GENERATE MATHEMATICAL OPTIMIZATION MODEL — 502

SELECT SET OF MODEL FIDELITY AND DATA SUFFICIENCY REGIONS IN HISTORICAL DATA — 504

GENERATE AUGMENTED OPTIMIZATION MODEL RESTRICTED TO SELECTED SET OF MODEL FIDELITY AND DATA SUFFICIENCY REGIONS — 506

DECISIONS OF AUGMENTED OPTIMIZATION MODEL SHOW IMPROVEMENT OVER EXISTING DECISIONS THAT EXCEEDS SOLUTION IMPROVEMENT THRESHOLD? — 508

NO

YES

GENERATE ADDITIONAL DATA USING AUGMENTED OPTIMIZATION MODEL AND ADD TO HISTORICAL DATA — 510

RECEIVE HISTORICAL DATASET AND
GENERATION ALGORITHM USED
TO GENERATE OPTIMIZATION MODEL ⌐602

DEFINE FORMAL QUALITY MEASURE OF QUALITY
IMPROVEMENT AND CONSTRAINT SATISFACTION ⌐604

FIND GENERATED ROBUST COUNTERPART FOR
WHICH THE RESULTING UNCERTAINTY SET IS
OPTIMAL STRUCTURE TO OBTAIN TARGET QUALITY ⌐606

600

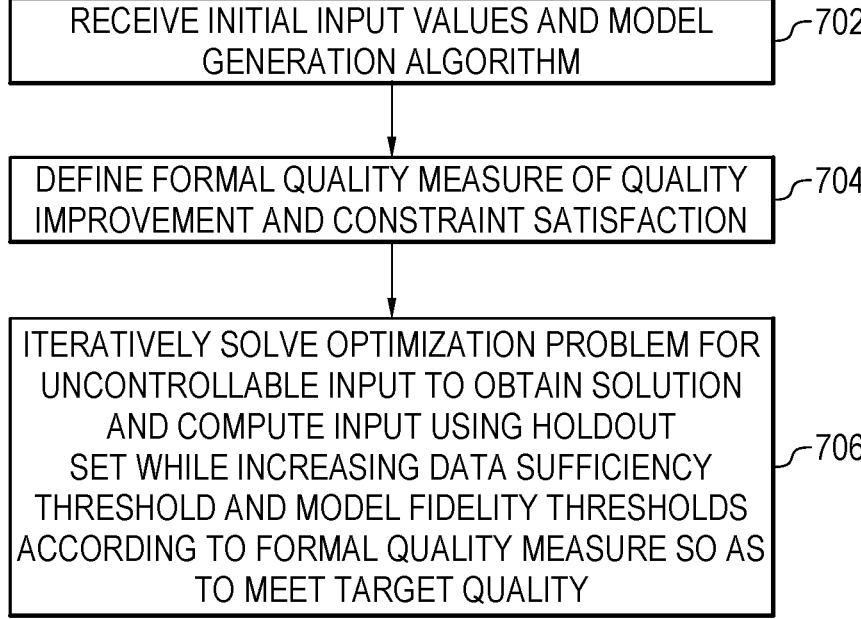

RECEIVE INITIAL INPUT VALUES AND MODEL GENERATION ALGORITHM ⌐702

DEFINE FORMAL QUALITY MEASURE OF QUALITY IMPROVEMENT AND CONSTRAINT SATISFACTION ⌐704

ITERATIVELY SOLVE OPTIMIZATION PROBLEM FOR UNCONTROLLABLE INPUT TO OBTAIN SOLUTION AND COMPUTE INPUT USING HOLDOUT SET WHILE INCREASING DATA SUFFICIENCY THRESHOLD AND MODEL FIDELITY THRESHOLDS ACCORDING TO FORMAL QUALITY MEASURE SO AS TO MEET TARGET QUALITY ⌐706

Figure 8:
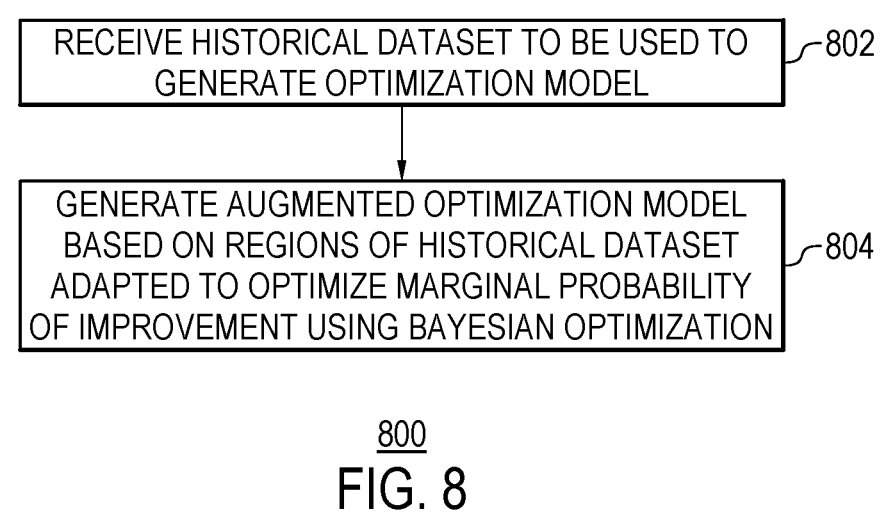

RECEIVE HISTORICAL DATASET TO BE USED TO GENERATE OPTIMIZATION MODEL ⟋802

GENERATE AUGMENTED OPTIMIZATION MODEL BASED ON REGIONS OF HISTORICAL DATASET ADAPTED TO OPTIMIZE MARGINAL PROBABILITY OF IMPROVEMENT USING BAYESIAN OPTIMIZATION ⟋804

RECEIVE HISTORICAL DATA TO BE USED TO
GENERATE AUGMENTED OPTIMIZATION MODEL                    ⌐902

DERIVE ADDITIONAL CONSTRAINTS DIRECTLY FROM GAUSSIAN
PROCESS BASED (GP) PROBABILITY OF IMPROVEMENT            ⌐904

GENERATE AUGMENTED OPTIMIZATION MODEL BASED ON GP
PROBABILITY OF IMPROVEMENT AND DIRECTLY DERIVED
CONSTRAINTS                                             ⌐906

900

AUGMENTING MATHEMATICAL OPTIMIZATION MODELS GENERATED FROM HISTORICAL DATA

BACKGROUND

The present techniques relate to automated generation of mathematical optimization models. More specifically, the techniques relate to augmenting mathematical optimization models.

SUMMARY

According to an embodiment described herein, a system can include processor to receive historical data, a formal quality measure, a target quality threshold, and a mathematical optimization model. At least part of the mathematical optimization model is generated from the historical data. The processor can also further measure a quality of the mathematical optimization model using the formal quality measure. The processor can also augment the mathematical optimization model such that the measured quality of the augmented mathematical optimization model exceeds the target quality threshold.

According to another embodiment described herein, a method can include receiving, via a processor, historical data, a formal quality measure, a target quality threshold, and a mathematical optimization model as input. At least part of the mathematical optimization model is generated from the historical data and at least part of the mathematical optimization model is learnt from the historical data. The method can further include measuring, via the processor, a quality of the mathematical optimization model using the formal quality measure. The method can also further include augmenting, via the processor, the mathematical optimization model such that the measured quality of the augmented mathematical optimization model exceeds the target quality threshold.

According to another embodiment described herein, a computer program product for augmenting optimization models can include computer-readable storage medium having program code embodied therewith. The computer readable storage medium is not a transitory signal per se. The program code executable by a processor to cause the processor to receive historical data, a formal quality measure, a target quality threshold, and a mathematical optimization model, wherein at least part of the mathematical optimization model is generated from the historical data. The program code can also cause the processor to measure a quality of the mathematical optimization model using the formal quality measure. The program code can also cause the processor to augment the mathematical optimization model such that the measured quality of the augmented mathematical optimization model exceeds the target quality threshold.

BRIEF DESCRIPTION OF THE SEVERAL VIEWS OF THE DRAWINGS

FIG. 3A is a process flow diagram of an example method for augmenting an optimization models using a formal quality measure;

FIG. 3B is a process flow diagram of an example method for incrementally generating an augmented optimization model using a formal quality measure;

FIG. 5 is a process flow diagram of an example method that can iteratively generate an augmented optimization model based on selected model fidelity and data sufficiency regions;

FIG. 7 is a process flow diagram of an example method that can iteratively generate an augmented optimization model using a bi-level optimization approach;

FIG. 8 is a process flow diagram of an example method that can iteratively generate an augmented optimization model using Bayesian optimization;

DETAILED DESCRIPTION

Figure 1:
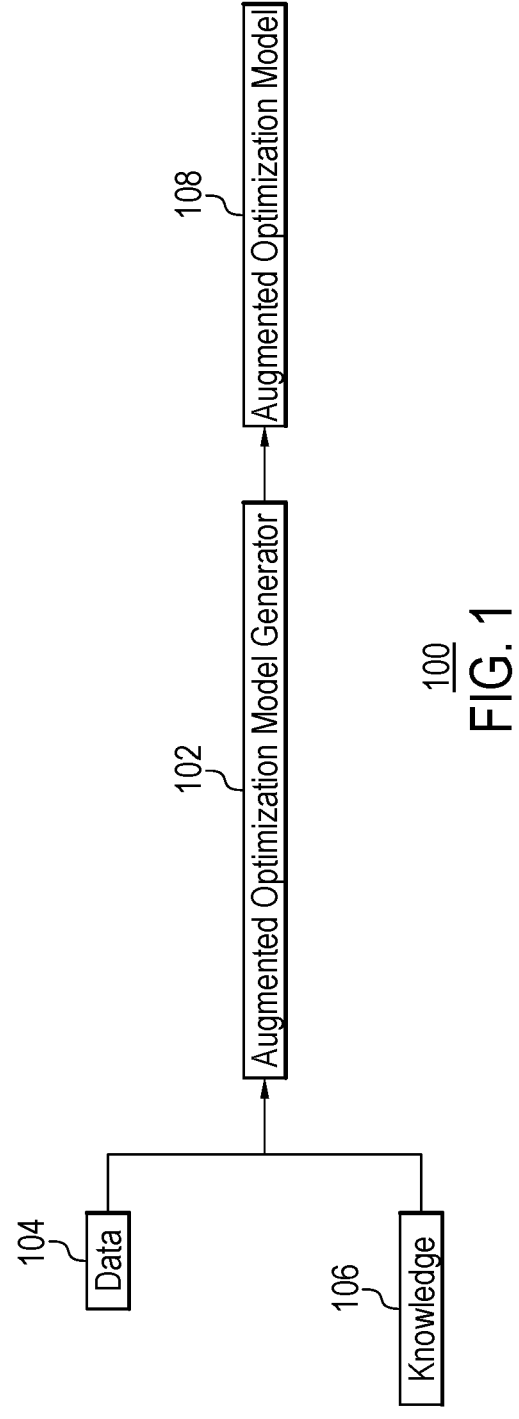
FIG. 1 is a block diagram of an example system for generating an augmented optimization model, parts or all of which is generated from data based on a formal measure of quality improvement.

Optimization models may be used to provide improved decision support to a variety of real-world problems. For example, optimization models may be used in various domains, including supply chain management, cloud computing operations, healthcare, environmental impact reduction, etc. Creating a mathematical optimization model may involve modeling both the constraints which govern the system, as well as the objective function to be optimized. However, creating a mathematical optimization model may also require optimization modeling expertise, which is quite rare, as well as a significantly burdened in terms of time. For example, such modeling expertise may typically be required on the order of months. In addition, there are cases in which modeling an optimization problem, or part of a problem is difficult even for optimization experts, such as systems or parts of systems which are hard to create a formal model for. This may severely limit the actual application of mathematical optimization and the benefits that mathematical optimization models currently provide.

A possible approach to address this issue is to automatically derive of all or parts of a mathematical optimization model, including objectives and constraints, from historical data. Such mathematical optimization model generation often requires machine learning techniques and algorithms to transform data into an optimization specification.

However, because optimization models need to incorporate the effect of the decision variables, the input data for such optimization model generators needs to include information about the historical decisions. For example, the historical decisions as made by human experts. In many real-world use cases such historical data exists, potentially making this approach feasible. However, learning any model from data introduces uncertainty and inaccuracy in the learnt model. In this setting, such uncertainty and inaccuracy may be compounded due to historical decisions' data. For example, the decisions may be explicit choices made by decision makers and therefore all possible decisions may not be naturally modelled by a probability distribution. In addition, historical data may typically not cover all the possible decisions, but rather, may be from a more restricted set of decisions that may not even be representative of all possible decisions. For example, the restricted set may be determined by use case specific best practices. Moreover, the actual decisions made may also influence the distribution of the other variables in the dataset. Therefore, the automatically generated optimization model may not capture the true behavior for all possible decisions, both in terms of the objective and the constraints. For example, regression models may be trained on this historical dataset may therefore erroneously generalize to decision domains not covered in the data. Thus, when such models are used within an optimization model, poor decisions may be produced.

In some example control systems, such as industrial control systems, optimization decision variables may include control variables, for which optimal set points are to be identified. In some systems, current practices are that first-principle models based on thermodynamics, heat and mass transfer, chemical kinetics, etc., may be used to model each process in such systems. These equations are then manually converted by an optimization expert into a formulation that can be efficiently solved by mathematical solvers. However, this approach requires significant time, skills, and domain understanding.

With the introduction of Industry 4.0, there is a widespread availability of fine-grained Internet of Things (IoT) sensor data that captures plant behavior. This allows the utilization of a data driven approach towards process control. For example, machine learning techniques may be used to learn and represent relationships between inputs and outputs for each process. The relationships can then be automatically converted into an optimization model to obtain temporal recommendations on optimal set points. As one example, a specific technical problem may include operational set point optimization of a steady-state flow in a production process that transforms input flows into output flows through some nonlinear process transformation that depends on controllable and uncontrollable inputs as well as operating process conditions. For example, an oil sands production process may take in a slurry of mined ore mixed with hot process water as input, and produce bitumen froth as output in a process unit known as a primary separation cell. Such a process unit may have historical sensor data measurements for various inputs and operational conditions in history, along with corresponding process outputs. For example, the various inputs may include input slurry rate, input hot process water rate, hot process water temperature and the operational conditions may include composition of the slurry. The corresponding process outputs may include bitumen froth, tailings flow rate, and water recovery. Choosing the input slurry rate along with hot process water temperature and flow rate, agitator speed in the primary separation vessel, for maximizing the production of bitumen froth is an example operational optimization problem which is based on a data-driven relationship that is firstly estimated using historical data and regression techniques from machine learning. However, as explained above, such optimization models may result in less than efficient performance of the plant. Moreover, measuring the absolute quality may be difficult or impossible. For example, an absolute quality may be the distance from actual optimal solution, which may be difficult or impossible to know. As used herein, a solution refers to a set of values for the decision variables of a system.

According to embodiments of the present disclosure, system includes a processor to receive historical data, a formal quality measure, a target quality threshold, and a mathematical optimization model. At least part of the mathematical optimization model is generated from the historical data. The processor can measure a quality of the mathematical optimization model using the formal quality measure. For example, the measured quality may address both objectives and constraints. In various examples, this measure may either an absolute quality measure that measures the quality as compared to the overall optimal solution, or a comparative quality measure of improvement over existing practices or policies. The processor can then augment the mathematical optimization model such that the measured quality of the augmented mathematical optimization model exceeds the target quality threshold. The embodiments thus provide a formal definition of a relative quality measure that incorporates the inaccuracy of the learnt optimization models into account.

In some examples, the quality measure with augmentation can be used to gradually improve the solution as follows: an improved solution may be implemented based on the recommendations of the initial augmented optimization model, more data is gathered once the improved solution is implemented, and the process is repeated to find an even better improved solution. Thus, embodiments described address uncertainties and inaccuracies of resulting in deriving all or parts of an optimization model from data, so as to ensure that good solutions are found by the overall optimization model. By explicitly and automatically accounting for the inaccuracies of the generated model, the embodiments thereby ensure that the optimization model, which has generated parts, has a particular quality and thus provides value. In addition, the embodiments thus enable quick and efficient generation of valuable optimization models from historical decision data.

With reference now to FIG. 1, a block diagram shows an example system for generating an augmented optimization model, parts or all of which is generated from data based on input data and knowledge. The example system is generally referred to by the reference number 100. FIG. 1 includes an augmented optimization model generator 102. The augmented optimization model generator 102 is shown receiving data 104 and knowledge 106. For example, the data 104 may be historical decisions data including information about historical decisions. In various examples, these historical decisions may have been made by human experts. The knowledge 106 may be problem-specific knowledge. For example, the knowledge 106 may be specified in a predetermined format. The augmented optimization model generator 102 generates an augmented optimization model 108. For example, the augmented optimization model 108 may be a mathematical optimization model that can be used by a mathematical optimization tool to select an element from a set of alternatives based on a set of criteria provided by the mathematical optimization model. In various examples, the augmented optimization model 108 may include any number of objectives and constraints.

In the example of FIG. 1, the augmented optimization model generator 102 may receive data 104 and knowledge 106 that includes a partial model specification and output an augmented optimization model 108 that is capable of generating decision policies that improve over existing decisions made in the data 104. Thus, the system 100 may ensure an improving solution.

Still referring to FIG. 1, a system may be modelled through a set of functions $f(x,p)$, $g_t(x,p)$, $t \in \{1, \ldots, K\}$ with $x \in \mathbb{R}^{d_x}$ being the set of $d_x$ decision variables and $p \in P \subset \mathbb{R}^{d_p}$ being a set of covariates. For example, the covariates p may be uncontrollable inputs that are exogenously provided. In some examples, the system can be described by an objective function $f(x,p)$ and a feasibility set $X \cap \Omega(p)$, where $\Omega(p) \subset \mathbb{R}^d$ can be defined by a set of T equations, $g_t(x,p) \leq 0$, $t \in \{1, \ldots, T\}$, and X is used to incorporate constraints. For example, such constraints may include a discreteness constraint. In some examples, the constraints could include a constraint that the sum of several variables would be less than some threshold. Given the above specification an input $p \in P$, a general goal may be to find an optimal decision $x^*(p)$:

$$x^*(p) = \underset{x \in X \cap \Omega(p)}{\arg \min} f(x, p) \qquad \text{Eq. 1}$$

However, the model of the system, as defined by $(f, \Omega)$ may not be specified. Rather, the received inputs may be problem related knowledge and a set of data D, such that each $d_i \in D$ is composed of a tuple of vectors $d_i = \langle x_i, p_i, f(x_i, p_i) \rangle$ such that $x_i \in X \cap \Omega(p_i)$. Moreover $p_i$ are independent and identically distributed from some joint distribution $\mathbb{P}$. In various examples, a learnt optimization model $\{f', \Omega'\}$ is provided.

In various examples, given a vector p drawn from $\mathbb{P}$, the generated model can be used to find:

$$x'^* = \underset{x \in X \cap \Omega'(p)}{\arg \min} f'(x, p) \qquad \text{Eq. 2}$$

where $\Omega'(p)$ is defined by $x \in \mathbb{R}^{d_x}$, such that $g'_t(x,p) \leq 0$, $t \in \{1, \ldots, T'\}$.

In various examples, an improvement measure can be defined and used to determine whether $x'^*$ is a good solution. For example, a good solution may be a solution that is feasible. In some examples, a first condition for $x'^*$ to be a good solution may be that it is feasible with a high enough probability. For example, the first condition may be described using the equation:

$$Pr(x'^* \in \Omega(p)) \geq (1-\delta_1) \qquad \text{Eq. 3}$$

A second condition used to determine whether $x'^*$ is a good solution may be that $x'^*$ provides a sufficiently good objective function value. For example, one way to define a sufficiently good objective function value is that the solution found by the approximate model $\{f', g_1, \ldots, g_T\}\epsilon$—approximates the optimal solution of the true system with a high probability. As one example, an absolute quality value for the probability of approximation may be defined using the following equation:

$$Pr(|f(x'^*,p)-f(x^*,p)| \leq \epsilon) \geq (1-\delta_2) \qquad \text{Eq. 4}$$

However, in many cases, such an absolute quality measure may be difficult or impossible to compute. Therefore, in various examples, an alternative, a relative quality measure may be used to determine by how much solution $x'^*$ improves over the existing decision policy. For example, this alternative formal quality measure may capture the way that currently such decisions are made. In some examples, this decision policy may be sampled from a distribution $H_{lp}$ conditioned on the uncontrollable p. Let $X_{H_{lp}} \neq H_{lp}$, then a condition that specifies that $x'^*$ improves $H_{lp}$ by $\epsilon$ with a high enough probability $\delta_2$ can be defined via the inequality:

$$Pr(f(X_{H_{lp}},p)-f(x'^*,m(y)) \geq \epsilon) \geq (1-\delta_2) \qquad \text{Eq. 5}$$

where $\epsilon$ is any value, and larger values of $\epsilon$ are better. In some examples, an alternative formulation can be used in which the improvement is specified by at least a $\epsilon$ percentage using the inequality:

$$Pr(f(x'^*,m(y)) \leq (1-\epsilon)f(X_{H_{lp}}) \geq (1-\delta_2) \qquad \text{Eq. 6}$$

where the parameter $\delta_2$ defines the probability by which a solution should be better than existing practices. For example, the parameter $\delta_2$ may be tunable and set based on the particular application.

In various examples, the augmented optimization model generator 102 can use the improvement metrics of Eqs. 5 and 6 with any suitable solution that finds such a $x'^*$ to implement an incremental improvement process. In some examples, the variables $\epsilon$ and $\delta_1$ or $\delta_2$ may be fixed, and an iterative process executed to search for appropriate model fidelity and data sufficiency to obtain a set of desired parameters for each. A specific example of such an incremental augmented optimization model generator 102 described with respect FIG. 2 and an example method 500 of incremental generation of optimization models described in FIG. 5. In some examples, incremental generation of optimization model may be more specifically executed using a robust optimization. For example, the incremental generation of the optimization model can be executed using the method 600 of FIG. 6. In some examples, the incremental optimization may be performed using a bi-level optimization approach. For example, the incremental generation of the optimization model can be executed using the method 700 of FIG. 7. In some examples, incremental generation of optimization model may alternatively be executed using Bayesian optimization. For example, the incremental generation of the optimization model can be executed using the method 800 of FIG. 8.

In some examples, the augmented optimization model generator 102 can directly generate the augmented optimization model. In some examples, the augmented optimization model generator 102 can implement a Bayesian approach using Gaussian processes to quantify these probabilities. For example, the augmented optimization model generator 102 can directly generate the augmented optimization model using the method 900 of FIG. 9.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). For example, in some embodiments, only part of the mathematical optimization model is generated from historical data while other parts of the mathematical optimization model may be directly specified. In various examples, the formal quality measure and augmentation may cover all of the mathematical optimization model, as well as the specific parts that were learnt.

Figure 2:
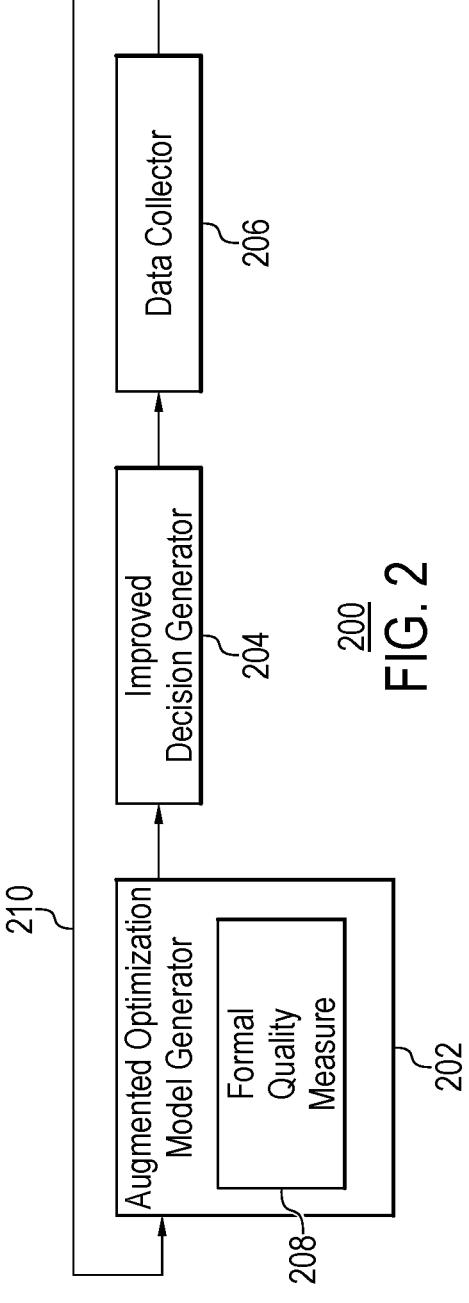
FIG. 2 is a process flow diagram of an example system for incrementally generating and improving an optimization model so as to provide increasingly better solutions.

FIG. 2 is a block diagram of an example system that can generate and incrementally improve an augmented optimization model so as to provide increasingly better solutions. The system 200 can be implemented with any suitable computing device, such as the computing device 1000 of FIG. 10. For example, the system 200 described below can be implemented by the processor 1002 or the processor 1302 of FIGS. 10 and 13. In various examples, the system 200 may be within an incremental augmented model generator in an optimization model generation system, such as the incremental augmented optimization model generator 102 described in FIG. 1.

The system 200 includes an augmented optimization model generator 202. The system 200 also includes an improved decision generator 204 communicatively coupled to the augmented optimization model generator 202. The system 200 also further includes a data collector 206 communicatively coupled to the improved decision generator 204. The augmented optimization model generator 202 includes a formal quality measure 208.

Referring to FIG. 2, the augmented optimization model generator 202 generates an optimization model from input data. For example, the data may be historical decision data. In various examples, the augmented optimization model generator 202 can augment the optimization model by adding new constraints which are based on a subset of the historical decision data restricted on data sufficiency and model fidelity constraints. In particular, model fidelity and data sufficiency may be enforced via constraints as described herein to achieve a target accuracy. As used herein, model fidelity refers to a constraint based on the accuracy of a generated model in the neighborhood of an optimization solution. For example, model fidelity may be used to make sure that each of the regression equations that participate in the objective function or the constraints enjoys acceptable prediction accuracy in the neighborhood of the optimal solution. As used herein, data sufficiency refers to a constraint used to ensure that the optimal solution belongs to a region in the space of decision variables where we have sufficient historical data. Data sufficiency may be measured because decision variables are input features that excite the various regression functions in the above problem formulation.

In various examples, the augmented optimization model generator 202 may restrict a solution space based on model fidelity and data sufficiency constraints. For example, Equation 2 may be restricted such that the feasible region for the solution x'* has a data sufficiency and model fidelity that each exceed a target quality threshold. However, given these restrictions, it may be difficult to obtain a solution which is an approximate global optimal as described in Eq. 4. Therefore, in various examples, the augmented optimization model generator 202 may instead generate improved solutions based on Eq. 5 or Eq. 6. As one example, the augmented optimization model generator 202 may assume a fixed improvement threshold parameter $\delta_2$. The augmented optimization model generator 202 may then find the spaces of model fidelity and data sufficiency that maximize ε so that Equation 5 holds. Alternatively, a similar formulation can be derived for Equation 6.

In some examples, the augmented optimization model generator 202 may begin with an initial set of model fidelity and data sufficiency regions used as an initial augmentation of the input optimization model, which may be provided by any suitable model generator. An augmentation may then be executed on the mathematical optimization model given the fidelity and sufficiency regions, after measuring the quality of the base mathematical optimization model using the formal quality measure 208. The augmented optimization model generator 202 can then test how much of an improvement the generated optimization model provides. In various examples, the augmented optimization model generator 202 may repeat this process with multiple model fidelity and data sufficiency regions.

In some examples, the augmented optimization model generator 202 may use a robust optimization method for deriving an augmented optimization model. Robust optimization, described by Bertsimas et al. in 2010, is a method for solving optimization problems with uncertainty. The robust optimization method considers that uncertain parameters of an optimization problem belong to some bounded region known as an uncertainty set and constructs an alternative optimization problem, known as the robust counterpart, which, in many cases, can be solved efficiently. The robust optimization method guarantees that solution of the robust counterpart problem is feasible for any realization of the uncertainty within the bounded region and provide a best objective value for the worst possible set of parameters. Moreover, under certain assumptions on the distributions of the uncertain parameters, the robust optimization method allows to construct bounded uncertainty set even if the corresponding probability distributions have infinite support, ensuring that any constraint of the optimization problem holds with given probability. Similarly, the robust optimization method can guarantee the worst bound of the objective value with any given probability. Given the ability to formulate and solve robust optimization problems, in some examples, the augmented optimization model generator 202 can find the optimal regions in terms of model fidelity and data sufficiency such that the generated uncertain optimization model is computationally tractable and so that the resulting uncertainty set has: (i) a minimal possible volume, allowing to build a robust counterpart whose solution guarantees the best possible improvement, and (ii), a structure that enables building a computationally tractable robust counterpart. In various examples, the optimization generation mechanism o is able to provide an estimate for error between the actual optimization problem and learnt optimization problem, both in terms of the constraints and the objectives. In addition, obtaining a computationally tractable optimization model places additional restrictions on optimization generation mechanism. For example, restricting o to generate piecewise linear functions allows construction of an uncertain mixed integer linear program (MILP), that can be further transformed into a MILP robust counterpart, assuming a polyhedral uncertainty set is selected. While the choice of the structure of the uncertainty set depends on the tractability requirements of the robust counterpart, the volume of the uncertainty set depends on the precision of the predictive model. Thus, the quality of the objective function can be improved, after obtaining a better prediction of the uncertain parameters.

In some examples, the augmented optimization model generator 202 may use a Gaussian processes (GPs) based method for measuring the quality of an optimization model. For example, examining the problem from a Bayesian perspective, the augmented optimization model generator 202 can be configured to view both $f$ and $\Omega$ stochastically. In particular, restricting $\Omega$ to subsets defined via a finite set of inequalities $\{f_i(x) \leq 0\}$ may provide a well-defined notion of stochasticity for $\Omega$, given a global upper bound on the number of constraints. For example, the finite set of inequalities may be affine, quadratic, etc. Given $\Omega \sim O$, which is established either as a prior derived from expert problem knowledge or as a posterior that additionally absorbs historical data, a joint posterior $GP_O$ that ties $f$ to $\Omega$ can be 9                                                    10 established, so that $GP_{\mathcal{O}}(\Omega=\Omega')=GP_{f|D\cap\Omega}$, the latter being the Gaussian process posterior established on $f$ given $D$ restricted to $\Omega$. Given some known policy $x_0$, $GP_{\mathcal{O}}$ then provides the marginal probability of improvement $Pr[f(x',\bullet)<(f(x_0,\bullet)+\epsilon]$ for a solution $x'$ of the minimization problem defined. For example, $x_0$ may be the current best practice or policy for generating decisions.

In various examples, the augmented optimization model generator 202 can use the marginal probability of improvement as a metric with which to assess any prediction-optimization scheme. For example, the marginal probability of improvement can be used to assess any optimization scheme that, given data $D$ associated with an objective target $f$ and a feasibility region $\Omega$, produces an optimal solution $x'$. The marginal probability of improvement combines the potential for gain on $f$ with the risk of choosing an $x'$ far from what an expert believes or the data considers to be a sensible solution, while also making sure that the objective target $f$ is learned from the most relevant data points. The augmented optimization model generator 202 can subsequently use the marginal probability of improvement to continuously improve the estimate $x'$ of $x^*$ by iteratively adapting the feasibility and sufficiency regions to produce a higher marginal probability of improvement. In some examples, the augmented optimization model generator 202 can iteratively adapt the feasibility and sufficiency regions to optimize the marginal probability of improvement using Bayesian optimization. Bayesian Optimization is a framework for expensive black-box optimization, namely, optimization where the objective target is unknown and/or computationally expensive to compute. In this case, the marginal probability of improvement will serve as the objective target for Bayesian Optimization.

In some examples, the augmented optimization model generator 202 can use Gaussian processes to directly generate an augmented optimization model. For example, given Equations 1 and 2 above, and eliding the dependence of $x^*$ and $x'^*$ on $p$, a quality measure may be used to evaluate the quality of $x'^*$ as a substitute for $x^*$, independent of any means of producing $\Omega'$ and $f'$ or solving the optimization problem of Eq. 2. Instead of trying to assess $x'^*$ against $x^*$, of which there may be no direct knowledge, the augmented optimization model generator 202 can consider $x'^*$ relative to some $x_0 \in \mathbb{R}^{d_x}$, for instance, the current best practice or policy. For example, the augmented optimization model generator 202 can estimate the probability that the proposed optimum $x'^*$ improves upon a known policy $x_0$. An estimate of the probability of improvement of $x'^*$ relative to $x_0$ at $p$ may thus be calculated using the equation:

$$Pr[f(x'^*,p)<f(x_0,p)+\epsilon],\ \epsilon\geq0 \qquad\qquad \text{Eq. 5}$$

To estimate the probability of improvement in Eq. 6, the augmented optimization model generator 202 can view both $f$ and $\Omega$ stochastically. Restricting $\Omega$ to subsets defined via a finite set of inequalities $\{g_k(x)\leq0\}$ provides a well-defined notion of stochasticity for $\Omega$. In some examples, assuming $\{g_k\}$ is affine, all feasibility regions $\Omega$ may be assumed to be convex.

In various examples, Gaussian processes (GPs) may be used to view $f$ stochastically. A Gaussian process governs the stochastic properties of a random function in the same way that a Gaussian probability distribution governs the properties of a random variable. A Gaussian process on $f$ establishes $f(x,p)\sim N(\mu(x,p),\sigma^2(x,p))$ for every $(x,p)\in \mathbb{R}^{d_x}\times \mathbb{R}^{d_p}$.

Starting from data $D=\{(x_i,p_i,y_i)\}$, and assuming a prior $\Omega \sim \mathcal{O}$, a marginalized probability of improvement may be calculated using the equation:

$$Pr[f(x'^*,p)<f(x_0,p)+\epsilon]=\Sigma_{D'\subseteq D}\omega_D\cdot Pr_{GP_{f|D'}}[f(x'^*,p)<f \\ (x_0,p)+\epsilon] \qquad \text{Eq. 6}$$

with $$\omega_D=\int_{m^{-1}(D')}d\Omega \qquad\qquad \text{Eq. 7}$$

where the measure $d\Omega$ is strictly determined by $\mathcal{O}$. The map $m: \Omega \mapsto D\cap\Omega$ sends a feasibility region $\Omega$ to a subset of the data restricted to $\Omega$, thus, it establishes a filtration of the space of feasibility regions through subsets of $D$. The probability of improvement of Eq. 7 is a strong metric with which to assess prediction-optimization schemes, namely, any scheme that, given data $D$ associated with an objective target and given knowledge, i.e., constraints, produces an optimal solution $x'^*$ as in Eq. 2. Given $p\in P$, Eq. 7 combines the potential for gain on $f$ with the risk of choosing $x'^*$ far from what the expert believes or the data considers to be sensible constraints, while also making sure that a model is learned from the most relevant data points.

In some examples, the augmented optimization model generator 202 can use Gaussian processes to augment the feasibility region $\Omega$ using data $D$ so as to ensure a solution that meets a formal quality measure. For example, considering $GP_{f|D}$ established on the entire historical dataset, with its derived $$SD\sigma_{GP_{f|D}}$$

and given $\kappa_i\geq0$, $i=1, 2$, then the following function $S_{\kappa_1,\kappa_2}$ may be defined on feasibility regions:

$$S_{\kappa_1\kappa_2}(\Omega) = r_1(\Omega)^{-\kappa_1} r_2(\Omega)^{-\kappa_2} \frac{1}{|\Omega|}\int_{\Omega} \sigma_{GP_{f|D}}(x)dx \qquad \text{Eq. 8}$$

where $r_1(\Omega)=|\Omega\cap D|/|D|$ measures how much of $D$ is covered by $\Omega$, while $r_2(\Omega)=|Conv(\Omega\cap D)|/|\Omega|$ measures how much data-less volume $\Omega$ contains. The function $S_{\kappa_1,\kappa_2}$ thus incorporates three terms. The first term involving $r_1$ penalizes $\Omega$'s that contain too little of $D$. The second term involving $r_2$ penalizes $\Omega$'s that encompass too much data-less volume. The third term involving $\sigma_{GP_{f|D}}$ is an estimate of expected model uncertainty in $\Omega$. In other words, $r_1$ and $r_2$ address data fidelity, and the integral represents data sufficiency. In various examples, optimizing the first and second terms of Eq. 9 helps ensure that an optimal solution is located in a feasibility region with sufficient historical data. Optimizing the third term helps ensure that an optimal solution is located in a feasibility region with better model accuracy. Put together, these terms strike a balance between reducing error on the one hand and capturing more data-populated feasible space on the other. In various examples, a feasibility region $\Omega^*$ is optimal with respect to $GP_{f|D}$ and $(\kappa_1,\kappa_2)$ if the following equation holds:

$$S_{k_1,k_2}(\Omega^*) = \min_{\Omega} S_{k_1,k_2} \qquad\qquad \text{Eq. 9}$$

Solving the possibly convex optimization problem in Eq. 10 suggests a way to augment a predict-then-optimize scheme by learning the optimal feasibility region in tandem.

In some examples, the augmented optimization model generator 202 can use an additional approach for high quality solutions based on the concepts of data fidelity and data sufficiency for cases in which the assumptions required for Gaussian processes do not hold. For example, the augmented optimization model generator 202 can first explicitly define regions of the problem in which both data fidelity and model sufficiency hold. To define such regions in the X×P, a notion of distance between pairs of points from each of X and P may be defined. In one example, distance functions $d^X$: X×X→$\mathbb{R}_+$ and $d^P$: P×P→$\mathbb{R}_+$ may be defined for X and P, respectively. In various examples, these distances may be given from domain knowledge or learned in some way. To define regions of sufficient data and model fidelity, we have historical data D in the form of tuples $d_i=$ $\langle x_i,p_i,z_i \rangle \in$ D such that $x_i \in$ X, $p_i \in$ P with $x_i \in \Omega(p_i)$, $z_i = f(x_i, p_i)$. Given the notions of distance, thresholds $\delta_P > 0$, $\delta_X > 0$ and some historical data D, we can as define "close-by" uncontrollables $p_i$ for a given uncontrollable p∈ P under consideration (for which we are solving the problem defined by Eq. 1) using the equation:

$$\omega_D = \int_{m^{-1}(D')} d\Omega \qquad \text{Eq. 10}$$

In some examples, for the problem described by Eq. 1 with uncontrollable p, with thresholds $\epsilon_S \in (0; 1)$, a decision x∈ X may be considered to be in a region of sufficient data if:

$$|Q(x,p)|/|D| \geq \epsilon_S, \text{ where}$$

$$Q(x,p) = \{(x_i,p_i,z_i) \in S(p), d^X(x,x_i) \leq \delta_X\} \qquad \text{Eq. 11}$$

Similarly, a decision x∈ X may be considered to be in a region of sufficient model fidelity with respect to regression model $\hat{f}$: X×P→$\mathbb{R}$ and classifier $\hat{g}$: X×P→[0,1] if:

$$\sigma(\{|z_i - \hat{f}(x_i, p_i)|:(x_i, p_i, z_i) \in Q(x,p)\}) \leq \delta_M{}^f$$

$$\sigma(\{1 - \hat{g}(x_i, p_i):(x_i, p_i, z_i) \in Q(x,p)\}) \leq \delta_M{}^g \qquad \text{Eq. 12}$$

where $\sigma(\{\ldots\})$ is some aggregator over a set of scalars such as a mean, median, max (or some percentile in between). In various examples, an optimization problem for any given uncontrollable p∈ P can be formulated using the Equation:

$$\min_{x \in X, \hat{f}, \hat{g}} \hat{f}(x, p) s.t. \begin{cases} \hat{g}(x, p) \geq 1 - \epsilon_C \\ \text{Data sufficiency cnstrt. (Eq. 11)} \\ \text{Model fidelity cnstrt. (Eq. 12)} \end{cases} \qquad \text{Eq. 13}$$

In addition, given a holdout set of historical data denoted by V, then using the previously proposed probability of improvement based quality estimate, the augmented optimization model generator 202 can assess the quality of a particular solution technique that produces a decision x'*(p) for any given uncontrollable p as:

$$\rho = \Sigma_{(x,p,z) \in V} Pr(\hat{f}(x'^*(p), p) < z) \qquad \text{Eq. 14}$$

where ρ is an aggregation of the probability of improvements over multiple instances of the problem in Eq. 13 for different settings of uncontrollable p such that (x,p,z)∈ V. The augmented optimization model generator 202 can then generate high quality solutions using the following algorithm:

| ALGORITHM 1 |
|---|
| Iterative meta-algorithm for uncontrollable p. |

Input: Initial values for $\in_S$, $\in_M{}^f$, $\in_M{}^g$, $\in_C$ > 0, change threshold upper bound $\bar{\alpha}$.
Output: Decision x'*
  1: Initialize $\alpha \leftarrow \infty$, $\rho_{old} \leftarrow 1$, $\rho_{best} \leftarrow 0$.
  2: while $\alpha > \bar{\alpha}$ do
  3:   Solve Eq. 13 for current $\in_S$, $\in_M{}^f$, $\in_M{}^g$, $\in_C$ to get x'*(p).
  4:   Compute ρ as in Eq. 14 using the holdout set V.
  5:   $\alpha \leftarrow |\rho - \rho_{old}|$, $\rho_{old} \leftarrow \rho$.
  6:   if $\rho > \rho_{best}$ then
  7:     $\rho_{best} \leftarrow \rho$.
  8:   end if
  9:   Increase values of $\in_S$, $\in_M{}^f$, $\in_M{}^g$, $\in_C$.
10: end while
11: return Decision x'* (p) corresponding to $\rho_{best}$.

In various examples, Algorithm 1 may employ any scheme to solve multiple instances of Eq. 13 and return the decision with the highest aggregated probability of improvement on the holdout historical data.

The decision generator 204 generates improved decisions using models generated by the augmented optimization model generator 202. For example, the decisions may include sets of values for the decision variables of the system.

The data collector 206 can gather data resulting from the improved decisions. For example, the gathered data may include the exact fields of data that were collected previously. However, the values of the fields may be different as these values are now data resulting from the new decisions. In various examples, the data collector 206 can also add the gathered data to the historical data used by the augmented optimization model generator 202. Thus, the augmented optimization model generator 202 may use the gathered data to generated additional models, as indicated by an arrow 210.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

FIG. 3A is a process flow diagram of an example method for augmenting an optimization models using a formal quality measure. The method 300A can be implemented with any suitable computing device, such as the computing device 1000 of FIG. 10. For example, the method described below can be implemented by the processor 1002 or the processor 1302 of FIGS. 10 and 13. In some examples, the method 300A can be implemented in the system 200 of FIG. 2.

At block 302, a processor receives historical data, a formal quality measure, a target quality threshold, and a mathematical optimization model. For example, at least part of the mathematical optimization model is generated from the historical data. In various examples, the historical data may be a set of historical decisions for a particular system to be modeled. The optimization model may be generated using any suitable optimization model generation algorithm. For example, the optimization model generation algorithm may generate mathematical optimization models such as linear programs and convex programming.

At block 304, the processor measures a quality of the mathematical optimization model using a formal quality measure. For example, the formal quality measure may measure the quality of the solutions obtained by the generated optimization model. In some examples, the formal quality measure may be a solution improvement threshold in the form of a relative measure of improvement over an existing decision policy for a system. In some examples, the quality measure may be a solution improvement threshold in the form of a probability of improvement over an existing decision policy for the system. In various examples, the processor can iteratively augmenting the mathematical optimization model to optimize a marginal probability of improvement using Bayesian optimization. In some examples, the processor can augment the mathematical optimization model using robust optimization. In some examples, the processor can augment the mathematical optimization model using a bi-level optimization approach.

At block 306, the processor augments the mathematical optimization model such that the measured quality of the augmented mathematical optimization model exceeds the target quality threshold. For example, the augmented mathematical optimization model may improve upon the mathematical optimization model by a relative measurement, such as a percentage. In some examples, the augmented mathematical optimization model may also meet one or more constraints.

The process flow diagram of FIG. 3A is not intended to indicate that the operations of the method 300A are to be executed in any particular order, or that all of the operations of the method 300A are to be included in every case. Additionally, the method 300A can include any suitable number of additional operations.

FIG. 3B is a process flow diagram of an example method for incrementally generating an augmented optimization model using a formal quality measure. The method 300B can be implemented with any suitable computing device, such as the computing device 1000 of FIG. 10. For example, the method described below can be implemented by the processor 1002 or the processor 1302 of FIGS. 10 and 13. In some examples, the method 300B can be implemented using the system 200 of FIG. 2.

The method 300B includes similarly numbered elements of FIG. 3A. In addition, at block 308, the processor generates improved solutions using the augmented optimization model. For example, the improved solutions may include a set of decisions resulting in a more efficient or improved process. For example, the processor may deploy recommendations of the augmented mathematical optimization model in production and generate additional data.

At block 310, the processor collects additional data from the improved solutions and adds the additional data to the historical data. For example, the additional data may include particular decisions and the results of such decisions when executed in a production stage.

The process flow diagram of FIG. 3B is not intended to indicate that the operations of the method 300B are to be executed in any particular order, or that all of the operations of the method 300B are to be included in every case. Additionally, the method 300B can include any suitable number of additional operations. For example, the processor may generate an augmented mathematical optimization model based on the additional data to continuously improve a solution.

Figure 4:
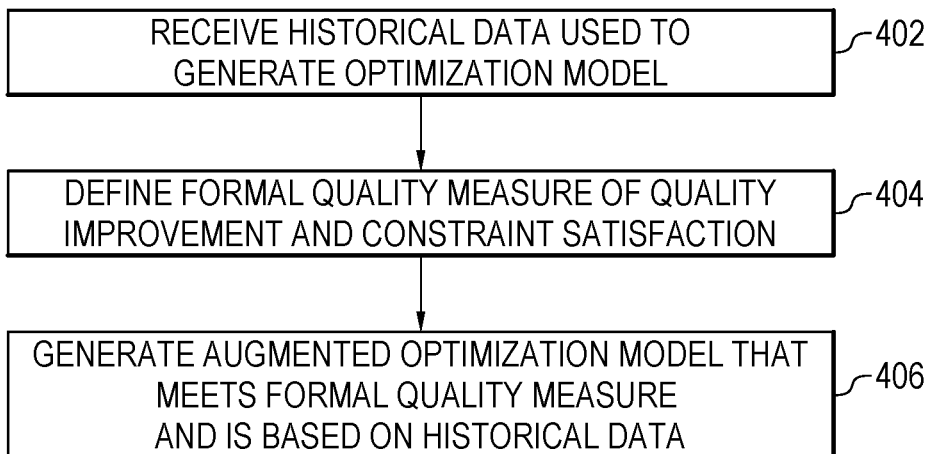
FIG. 4 is a process flow diagram of an example method that can generate an augmented optimization model based on a formal measure of quality improvement and constraint satisfaction.

FIG. 4 is a process flow diagram of an example method that can generate an augmented optimization models based a formal quality measure of quality improvement and constraint satisfaction. The method 400 can be implemented with any suitable computing device, such as the computing device 1000 of FIG. 10. For example, the method described below can be implemented by the processor 1002 or the processor 1302 of FIGS. 10 and 13.

At block 402, a processor receives historical data used to generate an optimization model. In some examples, the processor may also receive knowledge including one or more constraints.

At block 404, the processor defines a formal quality measure of a quality improvement and a constraint satisfaction. For example, the formal measure of relative quality improvement may be based on a solution improvement threshold that is a relative measure of improvement over an existing decision policy for the system. In some examples, the formal measure of quality may be a solution improvement threshold including a probability of improvement over an existing decision policy for the system. In various examples, the constraint satisfaction may include any number of constraints. In some examples, any of Eqs. 3-6 may be used as the formal quality measure. For example, the processor may receive a selected definition to use and provided values for various parameters, such as the epsilon and delta parameters in these Eqs.

At block 406, the processor generates an augmented optimization model that meets the formal quality measure and is based on the historical data. For example, the augmented optimization model may meet a threshold based on the formal quality measure and also satisfy the one or more constraints.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

FIG. 5 is a process flow diagram of an example method that can iteratively generate an augmented optimization model based on selected model fidelity and data sufficiency regions. The method 500 can be implemented with any suitable computing device, such as the computing device 1000 of FIG. 10. For example, the method described below can be implemented by the processor 1002 or the processor 1302 of FIGS. 10 and 13. In some examples, the method 500 may be implemented using the system 200 of FIG. 2.

At block 502, the processor receives historical data and a generation algorithm used to generate a mathematical optimization model. For example, the historical data may be historical decisions of a system to be modeled. In various examples, the generation algorithm may be any suitable mathematical optimization model generation algorithm. For example, the mathematical optimization model generation algorithm may be the mixed-integer optimization with constraint learning algorithm by Maragno et al. released in November 2021. In some examples, the mathematical optimization model generation algorithm may be the optimization with constraint learning algorithm released by Fajemisin et al. in October 2021. In various examples, the mathematical optimization model generation algorithm may be the optimizing objective functions determined from random forests algorithm by Biggs et al., first version released June 2017.

At block 504, a processor selects a set of model fidelity and data sufficiency regions in the historical data. For example, the processor may arbitrarily select an initial set of model fidelity and data sufficiency regions.

At block 506, the processor generates an augmented optimization model restricted to the selected set of model fidelity and data sufficiency regions. For example, the processor can then derive an augmented optimization model using the regions selected at block 504.

At block 508, the processor determines whether decisions of the augmented optimization model show an improvement over existing decisions that exceeds a relative quality improvement threshold. The improvement is measured using a formal quality measure. In some examples, the solution improvement threshold may be a relative measure of improvement over an existing decision policy for the system. In some examples, the solution improvement threshold may be a probability of improvement over an existing decision policy for the system. If the improvement of the decisions exceeds a solution improvement threshold, then the process may continue at block 510. If the solution improvement threshold is not exceeded, then the process may continue at block 502.

At block 510, the processor generates additional data using the augmented optimization model and adds the additional data to the historical data. The process may then continue at block 504. For example, the additional data may then be used to select a different set of model fidelity and data sufficiency regions and further augment the mathematical optimization model at block 506. In some examples, the additional data can also be used to recreate the mathematical optimization model from scratch.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. In various examples, the processor can repeat blocks 504-510 using different model fidelity and data sufficiency regions. For example, the processor may thus generate multiple augmented optimization models and then select the best model based on the formal quality measure.

Figure 6:
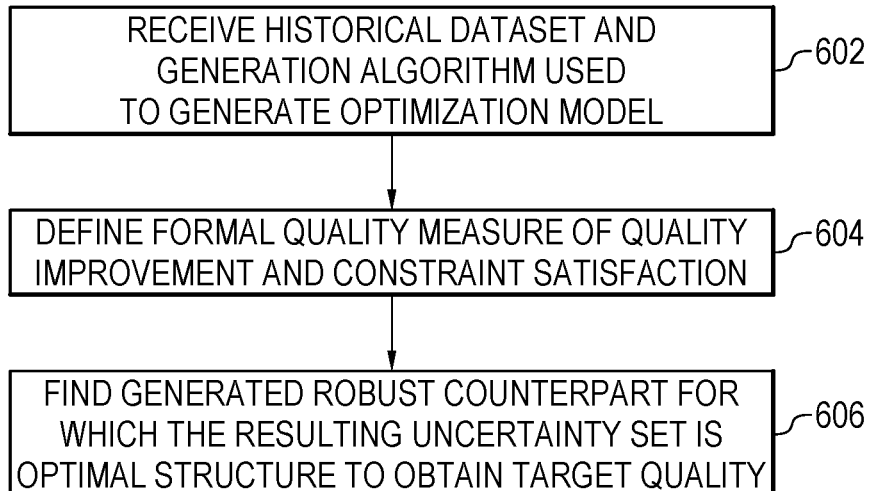
FIG. 6 is a process flow diagram of an example method that can iteratively generate an augmented optimization model using robust optimization.

FIG. 6 is a process flow diagram of an example method that can iteratively generate an augmented optimization models based on fidelity and sufficiency regions using robust optimization. The method 600 can be implemented with any suitable computing device, such as the computing device 1000 of FIG. 10. For example, the method described below can be implemented by the processor 1002 or the processor 1302 of FIGS. 10 and 13.

At block 602, a processor receives historical data and a generation algorithm used to generate an optimization model. For example, the historical data may be historical decisions in an industrial system. The processor may also receive a target quality.

At block 604, the processor defines a formal quality measure of quality improvement and constraint satisfaction. For example, any of Eqs. 3-6 may be used as the formal quality measure.

At block 606, the processor finds a generated robust counterpart for which the resulting uncertainty set is an optimal structure to obtain the target quality. For example, the target quality may be a threshold measured using the formal quality measure.

The process flow diagram of FIG. 6 is not intended to indicate that the operations of the method 600 are to be executed in any particular order, or that all of the operations of the method 600 are to be included in every case. Additionally, the method 600 can include any suitable number of additional operations. For example, the method 600 may include an iterative adjustment of the robust counterpart, where the robust counterpart is iteratively adjusted until the relative quality measure is reached.

FIG. 7 is a process flow diagram of an example method that can iteratively generate an augmented optimization models using a bi-level optimization approach. The method 700 can be implemented with any suitable computing device, such as the computing device 1000 of FIG. 10. For example, the method described below can be implemented by the processor 1002 or the processor 1302 of FIGS. 10 and 13.

At block 702, a processor receives initial input values and a model generation algorithm. For example, the initial input values may include data points from a historical dataset.

At block 704, the processor defines a formal quality measure of quality improvement and constraint satisfaction. For example, the formal quality measure may be based on any of Eqs. 3-6.

At block 706, the processor iteratively solves an optimization problem for uncontrollable input p to obtain solution and compute p using holdout set V while increasing data sufficiency threshold and model fidelity thresholds according to the formal quality measure so as to meet a target quality. For example, the target quality may be a relative quality improvement threshold.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

FIG. 8 is a process flow diagram of an example method that can iteratively generate an augmented optimization model using Bayesian optimization. The method 800 can be implemented with any suitable computing device, such as the computing device 1000 of FIG. 10. For example, the method described below can be implemented by the processor 1002 or the processor 1302 of FIGS. 10 and 13.

At block 802, a processor receives historical data to be used to generate optimization model. For example, the historical data may be historical decisions in an industrial system.

At block 804, the processor generates an augmented optimization model based on regions of the historical dataset adapted to optimize a marginal probability of improvement using Bayesian optimization. For example, marginal probability of improvement may be used to combine the potential for gain on the objective target with the risk of choosing a solution far from what an expert believes or the data considers to be sensible constraints, while also making sure that the objective target is learned from the most relevant data points.

Figure 9:
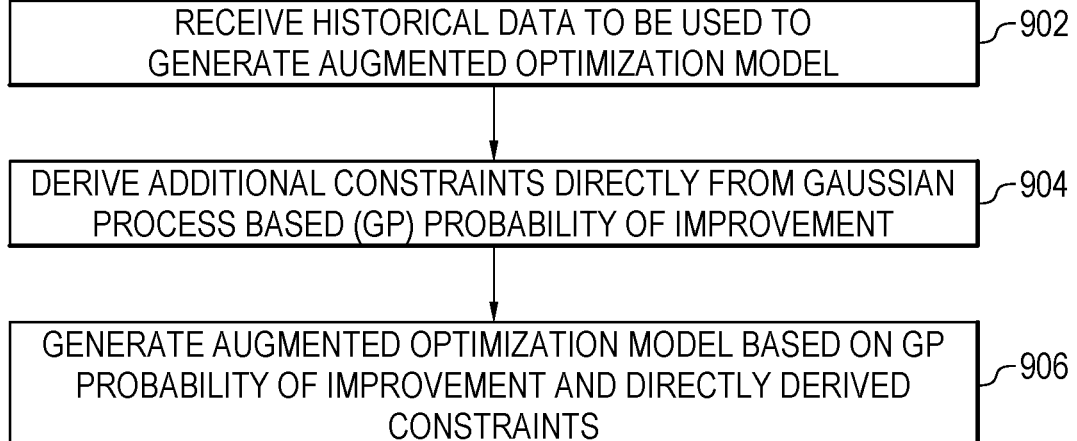
FIG. 9 is a process flow diagram of an example method that can directly generate an augmented optimization model using a Gaussian process based augmentation.

FIG. 9 is a process flow diagram of an example method that can directly generate an augmented optimization model using a Gaussian process based augmentation. The method 900 can be implemented with any suitable computing device, such as the computing device 1000 of FIG. 10. For example, the method described below can be implemented by the processor 1002 or the processor 1302 of FIGS. 10 and 13.

At block 902, a processor receives historical data to be used to generate an augmented optimization model. For example, the historical data may be historical decisions in an industrial system.

At block 904, the processor derives additional constraints directly from a Gaussian process (GP) based probability of improvement. For example, the processor may derive the additional constraints using any of Eqs. 5-7.

At block 906, the processor generates the augmented optimization model based on the GP probability of improvement and the directly derived constraints. For example, the processor may select a subset of the historical data based on the directly derived constraints to maximize the marginal probability of improvement.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
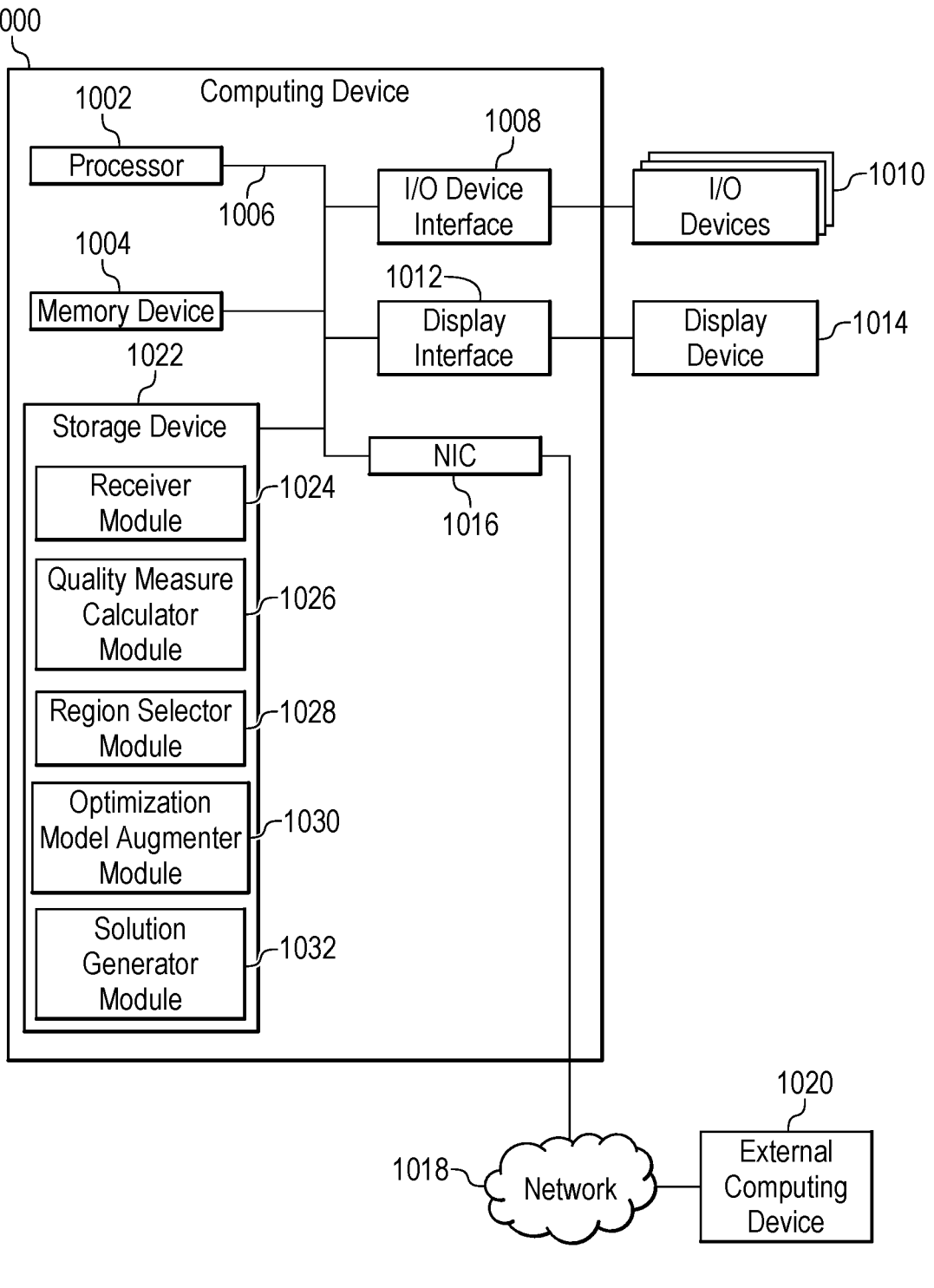
FIG. 10 is a block diagram of an example computing device that can augment mathematical optimization models based on a formal measure of quality improvement.

FIG. 10 is block diagram of an example computing device that can augment mathematical optimization models based on a formal measure of quality improvement. The computing device 1000 may be for example, a server, desktop computer, laptop computer, tablet computer, or smartphone. In some examples, computing device 1000 may be a cloud computing node. Computing device 1000 may be described in the general context of computer system executable instructions, such as program modules, being executed by a computer system. Generally, program modules may include routines, programs, objects, components, logic, data structures, and so on that perform particular tasks or implement particular abstract data types. Computing device 1000 may be practiced in distributed cloud computing environments where tasks are performed by remote processing devices that are linked through a communications network. In a distributed cloud computing environment, program modules may be located in both local and remote computer system storage media including memory storage devices.

The computing device 1000 may include a processor 1002 that is to execute stored instructions, a memory device 1004 to provide temporary memory space for operations of said instructions during operation. The processor can be a single-core processor, multi-core processor, computing cluster, or any number of other configurations. The memory 1004 can include random access memory (RAM), read only memory, flash memory, or any other suitable memory systems.

The processor 1002 may be connected through a system interconnect 1006 (e.g., PCI®, PCI-Express®, etc.) to an input/output (I/O) device interface 1008 adapted to connect the computing device 1000 to one or more I/O devices 1010.

The I/O devices 1010 may include, for example, a keyboard and a pointing device, wherein the pointing device may include a touchpad or a touchscreen, among others. The I/O devices 1010 may be built-in components of the computing device 1000, or may be devices that are externally connected to the computing device 1000.

The processor 1002 may also be linked through the system interconnect 1006 to a display interface 1012 adapted to connect the computing device 1000 to a display device 1014. The display device 1014 may include a display screen that is a built-in component of the computing device 1000. The display device 1014 may also include a computer monitor, television, or projector, among others, that is externally connected to the computing device 1000. In addition, a network interface controller (NIC) 1016 may be adapted to connect the computing device 1000 through the system interconnect 1006 to the network 1018. In some embodiments, the NIC 1016 can transmit data using any suitable interface or protocol, such as the internet small computer system interface, among others. The network 1018 may be a cellular network, a radio network, a wide area network (WAN), a local area network (LAN), or the Internet, among others. An external computing device 1020 may connect to the computing device 1000 through the network 1018. In some examples, external computing device 1020 may be an external webserver 1020. In some examples, external computing device 1020 may be a cloud computing node.

The processor 1002 may also be linked through the system interconnect 1006 to a storage device 1022 that can include a hard drive, an optical drive, a USB flash drive, an array of drives, or any combinations thereof. In some examples, the storage device may include a receiver module 1024, a quality measure calculator module 1026, a region selector module 1028, an optimization model augmenter module 1030, and a solution generator module 1032. The receiver module 1024 can receive historical data, a formal quality measure, a target quality threshold, and a mathematical optimization model. For example, at least part of the mathematical optimization model is generated from the historical data. The quality measure calculator module 1026 can measure a quality of the mathematical optimization model using the formal quality measure. In some examples, the formal quality measure may be a relative quality measure. For example, the formal quality measure may be a solution improvement threshold that is a relative measure of improvement over an existing decision policy for the system. In some examples, the relative quality measure may be a probability of improvement measured by Gaussian Processes. In some examples, the quality measure includes a solution improvement threshold including a probability of improvement over an existing decision policy for the system. In some examples, the formal quality measure may be a measure of distance from an absolute optimal solution. For example, the formal quality measure may be a probabilistic or deterministic distance measure from the absolute optimal solution. The region selector module 1028 can select regions of historical data based on the formal quality measure. For example, the regions may be regions based on constraints, such as model fidelity and data sufficiency regions. The optimization model augmenter module 1030 can augment the mathematical optimization model such that the measured quality of the augmented mathematical optimization model exceeds the target quality threshold. For example, the optimization model augmenter module 1030 can add new constraints so as to ensure that the target quality threshold is exceeded. In some examples, the optimization model augmenter module 1030 can augment the mathematical optimization model in an iterative manner. In various examples, the augmentation of the mathematical optimization model is executed based on a model fidelity constraint. In some examples, the augmentation of the mathematical optimization model is executed based on a data sufficiency constraint. In various examples, the optimization model augmenter module 1030 can iteratively augment the mathematical optimization model to optimize a marginal probability of improvement using Bayesian optimization. In some examples, the optimization model augmenter module 1030 can augment the mathematical optimization model using a robust optimization. In some examples, the optimization model augmenter module 1030 can augment the mathematical optimization model using a bi-level optimization approach. In some examples, the optimization model augmenter module 1030 can directly augment the mathematical optimization model using a Gaussian process based approach. The solution generator module 1032 can generate a solution based on the augmented mathematical optimization model. For example, the solution may include any number of values for decision variables of a system, such as an industrial control system. In some examples, a recommendation of the augmented mathematical optimization model may be deployed in production, additional data is generated, and the optimization model augmenter module 1030 can generate a second augmented mathematical optimization model based on the additional data to continuously improve a solution. For example, this additional iterative process may build upon the incremental improvement achieved by each step by the augmented mathematical optimization model that may be created by an iterative process, with an outer iterative loop that may move closer and closer to an overall optimal solution.

It is to be understood that the block diagram of FIG. 10 is not intended to indicate that the computing device 1000 is to include all of the components shown in FIG. 10. Rather, the computing device 1000 can include fewer or additional components not illustrated in FIG. 10 (e.g., additional memory components, embedded controllers, modules, additional network interfaces, etc.). Furthermore, any of the functionalities of the receiver module 1024, the quality measure calculator module 1026, the region selector module 1028, the optimization model augmenter module 1030, and the solution generator module 1032 may be partially, or entirely, implemented in hardware and/or in the processor 1002. For example, the functionality may be implemented with an application specific integrated circuit, logic implemented in an embedded controller, or in logic implemented in the processor 1002, among others. In some embodiments, the functionalities of the receiver module 1024, the quality measure calculator module 1026, the region selector module 1028, the optimization model augmenter module 1030, and the solution generator module 1032 can be implemented with logic, wherein the logic, as referred to herein, can include any suitable hardware (e.g., a processor, among others), software (e.g., an application, among others), firmware, or any suitable combination of hardware, software, and firmware.

Figure 11:
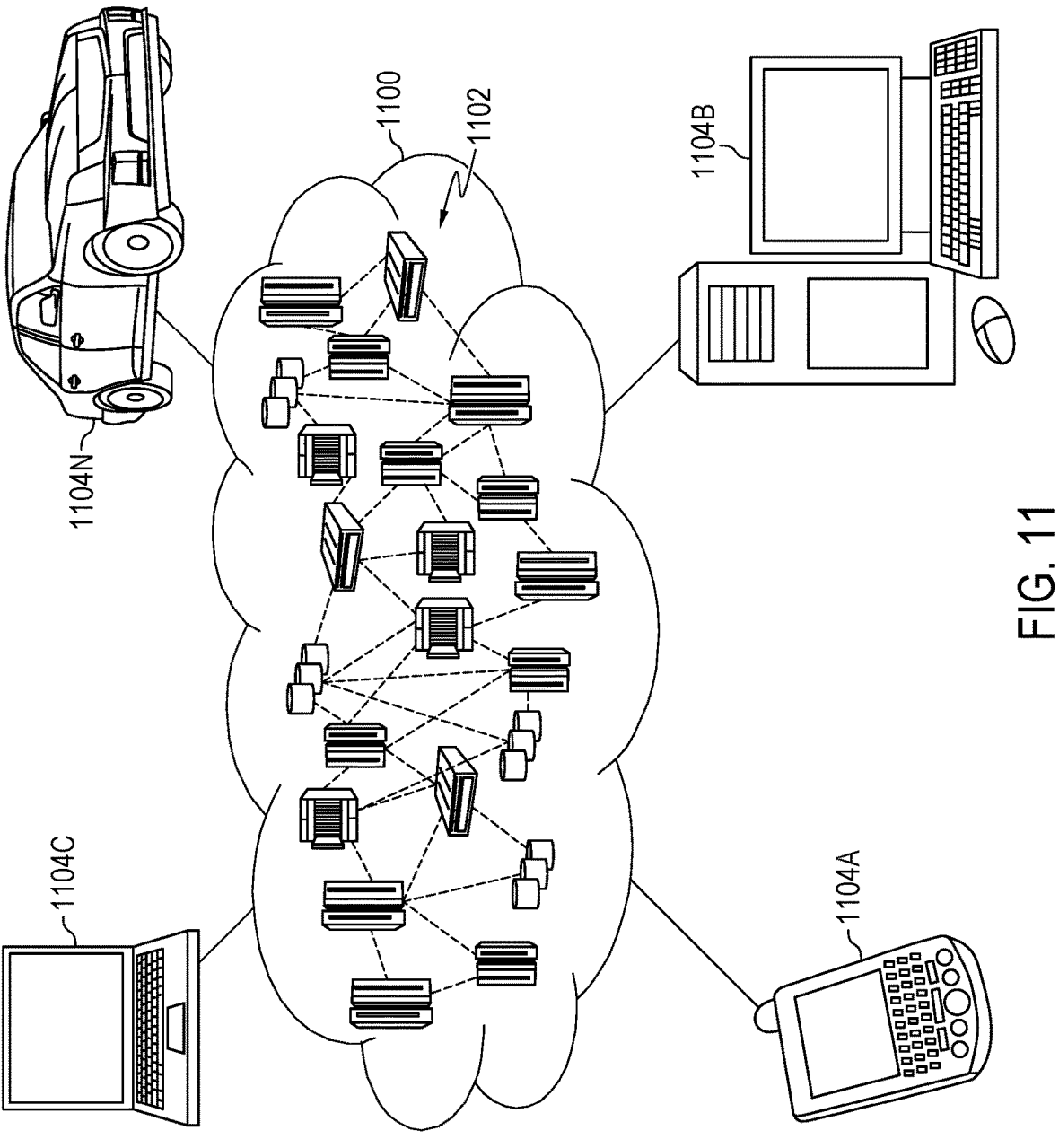
FIG. 11 is a diagram of an example cloud computing environment according to embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104A, desktop computer 1104B, laptop computer 1104C, and/or automobile computer system 1104N may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104A-N shown in FIG. 11 are intended to be illustrative only and that computing nodes 1102 and cloud computing environment 1100 can communicate with any type of computerized device over any type of network and/or network addressable connection (e.g., using a web browser).

Figure 12:
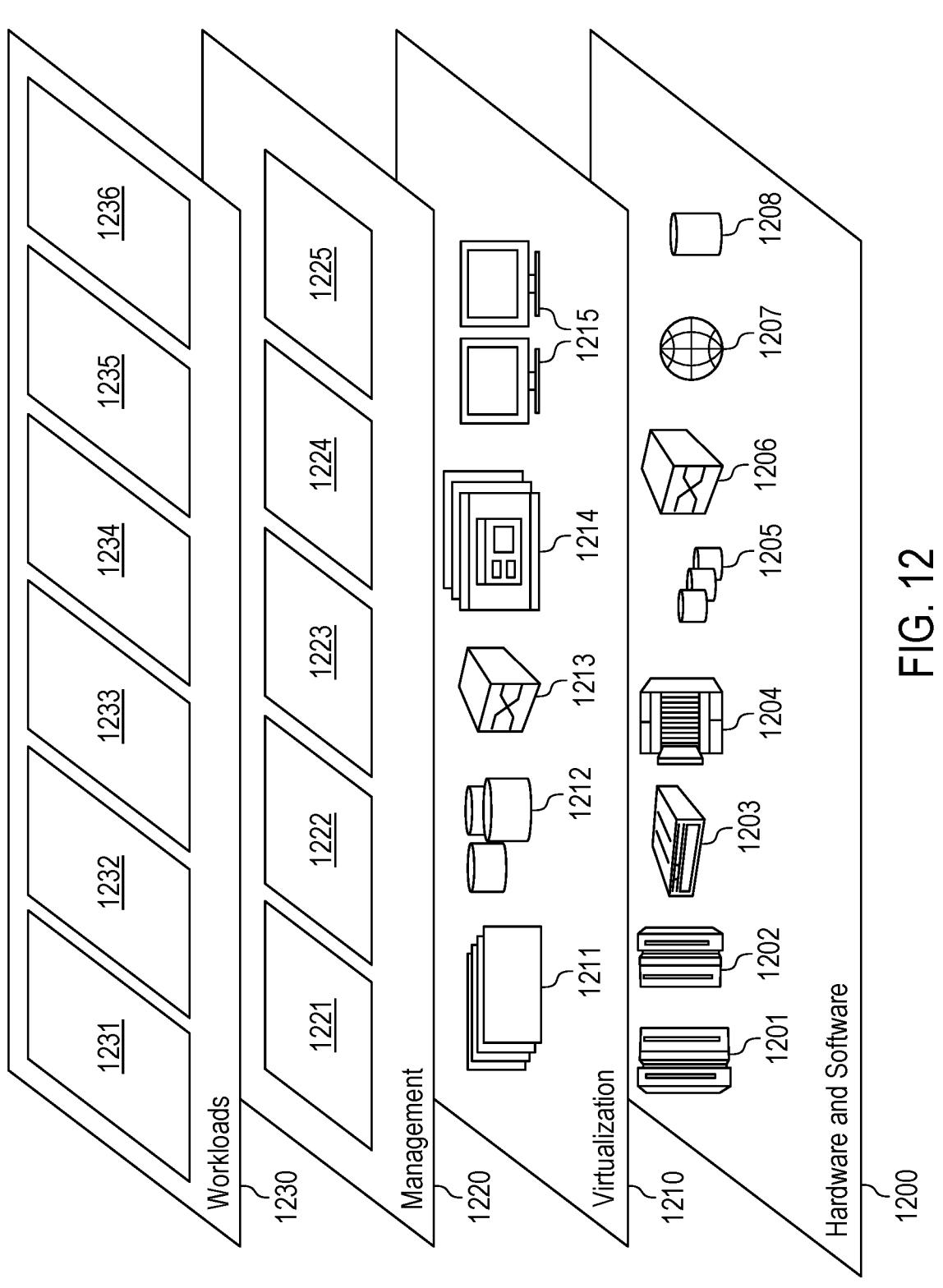
FIG. 12 is a diagram of an example abstraction model layers according to embodiments described herein.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1200 includes hardware and software components. Examples of hardware components include: mainframes 1201; RISC (Reduced Instruction Set Computer) architecture based servers 1202; servers 1203; blade servers 1204; storage devices 1205; and networks and networking components 1206. In some embodiments, software components include network application server software 1207 and database software 1208.

Virtualization layer 1210 provides an abstraction layer from which the following examples of virtual entities may be provided: virtual servers 1211; virtual storage 1212; virtual networks 1213, including virtual private networks; virtual applications and operating systems 1214; and virtual clients 1215.

In one example, management layer 1220 may provide the functions described below. Resource provisioning 1221 provides dynamic procurement of computing resources and other resources that are utilized to perform tasks within the cloud computing environment. Metering and Pricing 1222 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1223 provides access to the cloud computing environment for consumers and system administrators. Service level management 1224 provides cloud computing resource allocation and management such that required service levels are met. Service Level Agreement (SLA) planning and fulfillment 1225 provide pre-arrangement for, and procurement of, cloud computing resources for which a future requirement is anticipated in accordance with an SLA.

Workloads layer 1230 provides examples of functionality for which the cloud computing environment may be utilized. Examples of workloads and functions which may be provided from this layer include: mapping and navigation 1231; software development and lifecycle management 1232; virtual classroom education delivery 1233; data analytics processing 1234; transaction processing 1235; and optimization model quality measurement and augmentation 1236.

The present invention may be a system, a method and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 13:
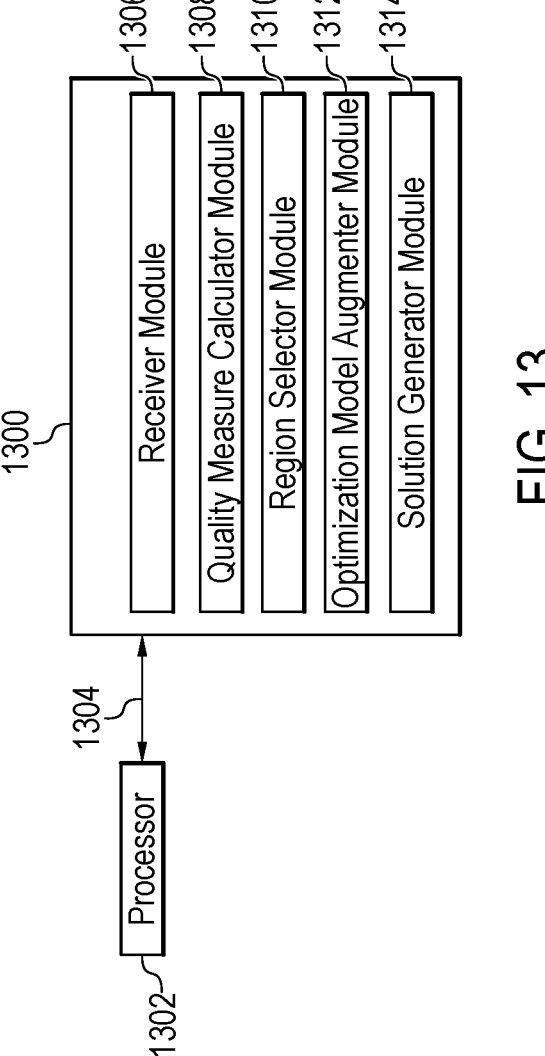
FIG. 13 is an example tangible, non-transitory computer-readable medium that can augment mathematical optimization models based on a formal measure of quality improvement.

Referring now to FIG. 13, a block diagram is depicted of an example tangible, non-transitory computer-readable medium 1300 that can augment mathematical optimization models based on a formal measure of quality improvement. The tangible, non-transitory, computer-readable medium 1300 may be accessed by a processor 1302 over a computer interconnect 1304. Furthermore, the tangible, non-transitory, computer-readable medium 1300 may include code to direct the processor 1302 to perform the operations of the methods 300A, 300B, and 400-900 of FIGS. 3A, 3B, and 4-9.

The various software components discussed herein may be stored on the tangible, non-transitory, computer-readable medium 1300, as indicated in FIG. 13. For example, a receiver module 1306 includes code to receive historical data, a formal quality measure, a target quality threshold, and a mathematical optimization model. For example, at least part of the mathematical optimization model is generated from the historical data. The receiver module 1306 also includes code to receive any number of constraints. In some examples, the receiver module 1306 includes code to receive additional data generated by augmented optimization models. A quality measure calculator module 1308 includes code to measure a quality of the mathematical optimization model using the formal quality measure. A region selector module 1310 includes code to select regions of the historical data based on the formal quality measure. An optimization model augmenter module 1312 includes code to augment the mathematical optimization model such that the measured quality of the augmented mathematical optimization model exceeds the target quality threshold. For example, the optimization model augmenter module 1312 may include code to augment the generated optimization model based on a selected subset of the historical data and the formal quality measure. In some examples, additional constraints will be added to the optimization model based on these regions. For example, by model fidelity and data sufficiency constraints. A solution generator module 1314 includes code to generate a solution based on the augmented optimization model. For example, the generated solution may be used to collect additional data to be added to the historical data and used to further augment the optimization model. In some examples, the generated solution of a final augmented optimization model may be used to temporally set one or more decision points of a control system, such as an industrial control system. In some examples, the solution generator module 1314 includes code to deploy a recommendation of the augmented mathematical optimization model in production and generate additional data. The optimization model augmenter module 1312 may include code to further augment the augmented mathematical optimization model based on the additional data to continuously improve a solution.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 13 may be included within the tangible, non-transitory, computer-readable medium 1300, depending on the specific application.

Figure 14:
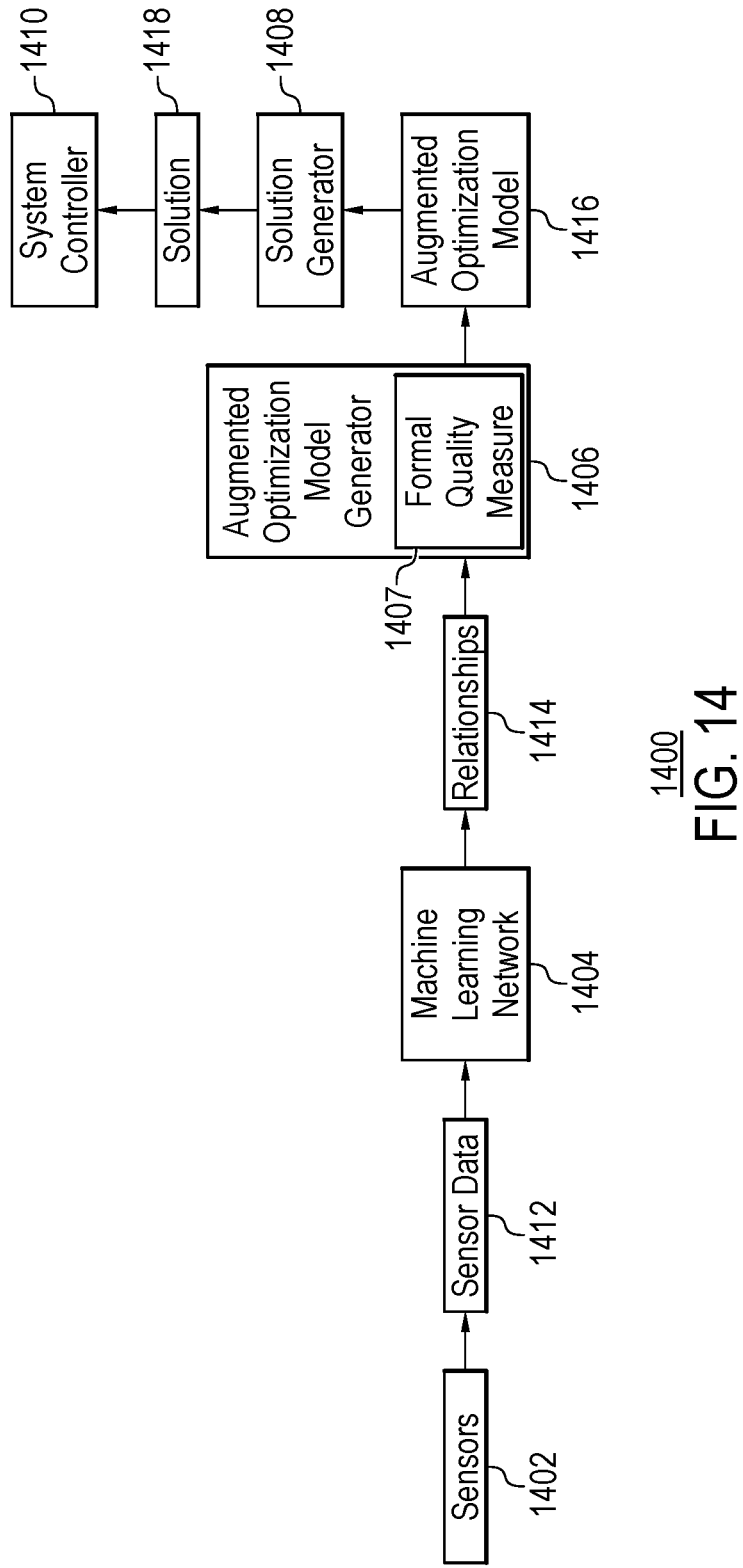
FIG. 14 is an example industrial system controlled using an augmented optimization model as described herein.

FIG. 14 is an example industrial system controlled using an augmented optimization model as described herein. The example industrial system 1400 can be controlled via an augmented optimization model generated using any of methods 300A, 300B, or 400-900. The example system 1400 includes a set of sensors 1402. For example, the sensors 1402 may be Internet of Things (IoT) sensors that are coupled to the Internet via a network to provide real-time information. The industrial system 1400 includes a machine learning network 1404 communicatively coupled to the sensors 1402. For example, the machine learning network 1404 may be wirelessly coupled to the sensor 1402. The industrial system 1400 also includes an augmented model generator 1406 communicatively coupled to the machine learning network 1404. The augmented model generator 1406 includes a formal quality measure. For example, the formal quality measure 1407 may be used by the augmented model generator 1406 to generate augmented optimization models based on a quality measure of the solutions that the augmented optimization models provide. The industrial system 1400 further also includes a solution generator 1408 communicatively coupled to the augmented model generator 1406. The industrial system further also includes a system controller 1410 communicatively coupled to the solution generator 1408. The sensors 1402 are shown generating sensor data 1412. For example, the sensor data 1412 may include input and output data. The machine learning network 1404 is shown generating relationships 1414. For example, the relationships 1414 may be relationships between inputs and outputs detected by the sensors 1402. The augmented model generator 1406 is shown generating an augmented model 1416. For example, the augmented model generator 1406 can generate an augmented model 1416 using any of the various techniques described herein. The solution generator 1408 is shown generating a solution 1418. For example, the solution 1418 may include a set of optimal set points for any number of process control variables adjustable by the system controller 1410.

In various examples, the industrial system 1400 may be a complex production or manufacturing system. For example, the industrial system 1400 may be an oil and gas system, a mining system, or food processing system. In the industrial system 1400, optimization decision variables may include control variables, for which optimal set points are to be identified. For example, in an oil and gas system, the control variables may include process pressure, process temperature, input crude oil flow rate, extent of chemical additives in the input flow rate. In a mining system, the control variables may include input flow rate (like input slurry flow rate, input hot process water flow rate, input hot process water temperature, primary separation cell agitator speed, in the example of oil sands production for bitumen froth production. In a food processing system, the control variables may include temperature of the process, input rate of food additives, mutual composition of food ingredient flow rates. In some cases, the control variables may be inefficiently set and therefore the industrial system 1400 may be running inefficiently. In various examples, a two-stage prediction-optimization based approach may be used to execute a data driven automated optimization modeling used to automatically control the system 1400. In various examples, the industrial system includes a number of sensors 1402. For example, the sensors 1402 may provide fine-grained IoT sensor data 1412 that captures plant behavior. This IoT sensor data 1412 may enable the utilization of a data driven approach towards process control. For example, a data driven approach may use machine learning techniques to learn and represent relationships between inputs and outputs for each process. For example, the machine learning network 1404 may be used to generate relationships 1414 that in some examples may be regression-based relationships. The relationships 1414 may be used to generate optimization models using any suitable techniques, as described herein. The augmented model generator 1406 can then augment the generated optimization models using the formal quality measure 1407. For example, the augmented optimization model may be generated using any of the techniques described herein. The solution generator 1408 can then generate temporal recommendations on optimal set points using the augmented optimization model 1416. In some examples, the optimal set points of solution 1418 may be used by the system controller 1410 to automatically adjust one or more control variables. In various examples, the temporal recommendations may be generated at set intervals, or driven by changes in the system. For example, the temporal recommendations may be generated in response to detecting that when a sensor value exceeds a threshold. In some examples, the temporal recommendations can then be used to automatically control the system via the system controller 1410.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor set;
one or more computer-readable storage media; and
program instructions stored on the one or more computer-readable storage media to cause the processor set to perform operations comprising:
automatically controlling components of an industrial system based on control variables;
receiving historical data from the industrial system, a formal quality measure, a target quality threshold, and a mathematical optimization model, wherein at least part of the mathematical optimization model is generated from the historical data;
measuring a quality of the mathematical optimization model using the formal quality measure;
augmenting the mathematical optimization model, wherein the augmenting comprises:
generating an augmented mathematical optimization model restricted to a set of the historical data selected based on model fidelity and data sufficiency constraints; and
selecting the augmented mathematical optimization model, wherein the selecting comprises determining that a measured quality of the augmented mathematical optimization model exceeds the target quality threshold;
generating, by the augmented mathematical optimization model, optimal set points for the control variables;
adjusting at least one of the control variables based on the optimal set points; and
automatically controlling the components of the industrial system based on the adjusted control variables.

2. The system of claim 1, wherein the generating the augmented mathematical optimization model is executed in an iterative manner.

3. The system of claim 2, wherein the generating the augmented mathematical optimization model comprises optimizing a marginal probability of improvement using Bayesian optimization.

4. The system of claim 2, wherein the generating the augmented mathematical optimization model comprises using robust optimization.

5. The system of claim 2, wherein the generating the augmented mathematical optimization model comprises directly generating the mathematical optimization model using a bi-level optimization approach.

6. The system of claim 1, wherein the generating the augmented mathematical optimization model comprises using a Gaussian process based approach.

7. The system of claim 1, wherein the operations further comprise:

deploying a recommendation of the augmented mathematical optimization model in production;

generating additional data; and augmenting the augmented mathematical optimization model to generate a second augmented mathematical optimization model based on the additional data to continuously improve a solution.

8. The system of claim 1, wherein the formal quality measure comprises a relative quality measure.

9. The system of claim 8, wherein the relative quality measure is probability of improvement measured by Gaussian Processes.

10. The system of claim 1, wherein the formal quality measure comprises a measure of distance from an absolute optimal solution.

11. The system of claim 1, wherein the formal quality measure comprises a relative measure of improvement over an existing decision policy for the industrial system.

12. The system of claim 1, wherein the formal quality measure comprises a probability of improvement over an existing decision policy for the industrial system.

13. The system of claim 1, wherein the selecting further comprises determining that the augmented mathematical optimization model satisfies at least one constraint.

14. The system of claim 1, wherein the historical data comprises historical decisions and information about the historical decisions.

15. A computer-implemented method, comprising:

automatically controlling components of an industrial system based on control variables;

receiving, via a processor, historical data from the industrial system, a formal quality measure, a target quality threshold, and a mathematical optimization model as input, wherein at least part of the mathematical optimization model is generated from the historical data and at least part of the mathematical optimization model is learnt from the historical data;

measuring, via the processor, a quality of the mathematical optimization model using the formal quality measure;

augmenting, via the processor, the mathematical optimization model, wherein the augmenting comprises:

generating an augmented mathematical optimization model restricted to a set of the historical data selected based on model fidelity and data sufficiency constraints; and selecting the augmented mathematical optimization model, wherein the selecting comprises determining that a measured quality of the augmented mathematical optimization model exceeds the target quality threshold;

generating, by the augmented mathematical optimization model, optimal set points for the control variables;

adjusting at least one of the control variables based on the optimal set points; and automatically controlling the components of the industrial system based on the adjusted control variables.

16. The computer-implemented method of claim 15, further comprising:

deploying a recommendation of the augmented mathematical optimization model in production;

generating additional data; and augmenting the augmented mathematical optimization model based on the additional data to continuously improve a solution.

17. The computer-implemented method of claim 15, wherein the generating the augmented mathematical optimization model comprises iteratively augmenting the mathematical optimization model to optimize a marginal probability of improvement using Bayesian optimization.

18. The computer-implemented method of claim 15, wherein the generating the augmented mathematical optimization model comprises using robust optimization.

19. A computer program product for augmenting optimization models, the computer program product comprising a computer-readable storage medium having program code embodied therewith, wherein the computer-readable storage medium is not a transitory signal per se, the program code executable by a processor to cause the processor to:

automatically control components of an industrial system based on control variables;

receive historical data from the industrial system, a formal quality measure, a target quality threshold, and a mathematical optimization model, wherein at least part of the mathematical optimization model is generated from the historical data;

measure a quality of the mathematical optimization model using the formal quality measure;

augment the mathematical optimization model, wherein the augmenting comprises:

generating an augmented mathematical optimization model restricted to a set of the historical data selected based on model fidelity and data sufficiency constraints; and selecting the augmented mathematical optimization model, wherein the selecting comprises determining that a measured quality of the augmented mathematical optimization model exceeds the target quality threshold;

generate, by the augmented mathematical optimization model, optimal set points for the control variables;

adjust at least one of the control variables based on the optimal set points; and automatically control the components of the industrial system based on the adjusted control variables.

20. The computer program product of claim 19, further comprising program code executable by the processor to:

deploy a recommendation of the augmented mathematical optimization model in production;

generate additional data; and further augment the augmented mathematical optimization model based on the additional data to continuously improve a solution.

\* \* \* \* \*